US012416190B2

(12) United States Patent
Irgang

(10) Patent No.: US 12,416,190 B2
(45) Date of Patent: Sep. 16, 2025

(54) GUIDING SYSTEM FOR GUIDING AT LEAST ONE DOOR LEAF, COMPRISING AT LEAST ONE SWITCH DEVICE AND AT LEAST ONE SENSOR

(71) Applicant: Julius Blum GmbH, Hoechst (AT)

(72) Inventor: Markus Irgang, Altach (AT)

(73) Assignee: JULIUS BLUM GMBH, Hoechst (AT)

( * ) Notice: Subject to any disclaimer, the term of this patent is extended or adjusted under 35 U.S.C. 154(b) by 224 days.

(21) Appl. No.: 18/207,395

(22) Filed: Jun. 8, 2023

(65) Prior Publication Data

US 2023/0320008 A1 Oct. 5, 2023

Related U.S. Application Data

(63) Continuation of application No. PCT/AT2021/060472, filed on Dec. 14, 2021.

(30) Foreign Application Priority Data

Dec. 17, 2020 (AT) .......................... GM 50267/2020

(51) Int. Cl.
*E05D 15/58* (2006.01)

(52) U.S. Cl.
CPC ...... *E05D 15/581* (2013.01); *E05D 2015/586* (2013.01); *E05Y 2900/212* (2013.01)

(58) Field of Classification Search
CPC ............ E05D 15/581; E05D 2015/586; E05Y 2900/212
USPC .......................................................... 312/307
See application file for complete search history.

(56) References Cited

U.S. PATENT DOCUMENTS

| | | | |
|---|---|---|---|
| 10,947,763 | B2 | 3/2021 | Blum et al. |
| 11,078,699 | B2 | 8/2021 | Gasser |
| 11,136,804 | B2 | 10/2021 | Rupp et al. |
| 11,320,153 | B2 | 5/2022 | Clements et al. |

(Continued)

FOREIGN PATENT DOCUMENTS

| | | |
|---|---|---|
| EP | 2 602 414 | 6/2013 |
| GB | 819500 | 9/1959 |

(Continued)

OTHER PUBLICATIONS

International Search Report issued Mar. 17, 2022 in International (PCT) Application No. PCT/AT2021/060472.

*Primary Examiner* — Matthew W Ing
(74) *Attorney, Agent, or Firm* — Wenderoth, Lind & Ponack, L.L.P.

(57) ABSTRACT

A guiding system includes a support on which a door leaf can be mounted; a support guide rail; and a guiding device by which the support is movably mounted or can be movably mounted on the support guide rail. The guiding system includes a switch device and/or a sensor or an interface for securing the switch device and/or sensor. The switch device and/or sensor is/are designed to generate a signal by which the power supply to an electric device can be interrupted and/or released. The switch device and/or sensor or interface is or can be positioned relative to the support guide rail such that the switch device and/or sensor can be switched and/or triggered in a specified position of the support, and thus the door leaf, relative to the support guide rail. The specified position is preferably an end position of the support relative to the support guide rail.

23 Claims, 23 Drawing Sheets

(56) References Cited

U.S. PATENT DOCUMENTS

| | | | | |
|---|---|---|---|---|
| 11,391,076 | B2 | 7/2022 | Rupp et al. | |
| 2011/0138801 | A1* | 6/2011 | Zimmer | A47B 88/457<br>60/527 |
| 2019/0178504 | A1* | 6/2019 | Clements | A47B 77/08 |
| 2019/0301216 | A1* | 10/2019 | Rupp | E05D 15/26 |
| 2020/0040632 | A1 | 2/2020 | Rupp et al. | |
| 2020/0048947 | A1 | 2/2020 | Blum et al. | |
| 2020/0063480 | A1 | 2/2020 | Gasser | |

FOREIGN PATENT DOCUMENTS

| | | |
|---|---|---|
| JP | 6-221053 | 8/1994 |
| JP | 2005-253515 | 9/2005 |
| JP | 3162284 | 8/2010 |
| JP | 2020-519787 | 7/2020 |
| JP | 2020-519788 | 7/2020 |
| JP | 2020-519789 | 7/2020 |
| WO | 2018/129575 | 7/2018 |

* cited by examiner

GUIDING SYSTEM FOR GUIDING AT LEAST ONE DOOR LEAF, COMPRISING AT LEAST ONE SWITCH DEVICE AND AT LEAST ONE SENSOR

BACKGROUND OF THE INVENTION

The invention relates to a guiding system for guiding at least one door leaf relative to a furniture carcass. The guiding system includes at least one support, on which the at least one door leaf can be mounted, preferably in an articulated manner. At least one, preferably at least two, support-guiding rail(s) are spaced apart from one another in a longitudinal direction of the at least one support and at least one guiding device, with which the at least one support can be or is mounted displaceably on the at least one support-guiding rail, preferably in a direction substantially transverse to a longitudinal direction of the at least one support.

The invention furthermore relates to a guiding arrangement for guiding at least one door leaf with at least two such guiding systems and a piece of furniture with a furniture carcass and at least one door leaf, wherein the furniture carcass has at least one interior, wherein the at least one interior can be covered, at least in areas, by the at least one door leaf and in which interior at least one electrical appliance is or can be arranged.

Guiding systems for guiding at least one door leaf relative to a furniture carcass are already known from the state of the art. When the door leaves are closed, the interior of the piece of furniture is not visible. Thus, it cannot be determined whether electrical appliances which are arranged in the interior of the piece of furniture are switched on or off.

If a user forgets to switch off an electrical appliance before closing the door leaves, the electrical appliance can remain switched on unintentionally and unattended over a long period of time when the door leaves are closed. An unattended electrical appliance can represent a safety risk, in particular if the electrical appliance is a heating appliance such as an electric oven. Power consumption is also increased unnecessarily by an unintentionally switched-on electrical appliance. This also applies to appliances, such as LED lamps, which are less harmful with regard to safety.

SUMMARY OF THE INVENTION

The object of the present invention is to remedy these disadvantages at least partly and to specify a guiding system that is improved compared with the state of the art, a guiding arrangement that is improved compared with the state of the art and a piece of furniture that is improved compared with the state of the art. In particular, the object of the present invention is to create a guiding system, a guiding arrangement and a piece of furniture which can be operated with electrical appliances safely and in an energy-saving manner.

According to the invention, the guiding system comprises at least one switch device and/or at least one sensor or at least one interface for fastening, preferably detachably, the at least one switch device and/or the at least one sensor, wherein the at least one switch device and/or the at least one sensor are/is formed to generate at least one signal, with which the power supply to at least one electrical appliance, preferably kitchen appliance, can be interrupted and/or enabled.

Through the interruption and/or enabling of the power supply by means of at least one signal, it can be ensured that the at least one electrical appliance is switched off or switched on depending on the switch position.

Furthermore, the at least one switch device and/or the at least one sensor or the at least one interface is or can be positioned relative to the at least one support-guiding rail in such a way that the at least one switch device and/or the at least one sensor can be switched and/or triggered in at least one predetermined position of the at least one support and thus of the at least one door leaf relative to the at least one support-guiding rail.

The at least one electrical appliance can thus be switched off or switched on by moving the at least one door leaf to at least one predetermined position.

Preferably, the at least one predetermined position is an end position of the at least one support relative to the at least one support-guiding rail.

It can thus be ensured that the at least one electrical appliance is switched on only when the door leaf is completely open. Conversely, it can also be ensured that the at least one electrical appliance is only switched off when the door leaf is completely open, for example an alarm system or a smoke sensor.

The at least one electrical appliance can thus no longer be unintentionally unattended. As a result, safety is increased and unnecessary power consumption is avoided.

A guiding arrangement according to the invention for guiding at least one door leaf relative to a furniture carcass comprises at least two guiding systems.

A piece of furniture according to the invention has at least one guiding system or at least one guiding arrangement.

At least one installation device can be provided, on which the at least one switch device and/or the at least one sensor or at least one component of the at least one switch device and/or of the at least one sensor can be installed fixedly relative to the at least one support-guiding rail.

Here, at least one adapter can be provided, with which the at least one switch device and/or the at least one sensor or the at least one component of the at least one switch device can be installed with at least two different spacings relative to the at least one installation device. The at least one switch device and/or the at least one sensor or the at least one component of the at least one switch device can thus be positioned as desired. Different types of switch devices and/or sensors can thus be built in such that they trigger and/or respond reliably.

In an embodiment, the at least one adapter has at least one first fastening interface for fastening, preferably detachably, the at least one adapter to the at least one installation device and at least one second fastening interface spaced apart therefrom in a height direction of the at least one adapter for fastening, preferably detachably, the at least one switch device and/or the at least one sensor or the at least one component of the at least one switch device.

The spacing of the two fastening interfaces of the adapter thus influences the spacing between the at least one installation device and the at least one switch device and/or the at least one sensor or the at least one component of the at least one switch device and/or of the at least one sensor.

The at least one adapter can be selected from a group of at least two adapters, the two fastening interfaces of which are spaced apart from one another to different extents in the height direction. Through the selection of a particular adapter, the spacing between the at least one installation device and the at least one switch device and/or the at least one sensor or the at least one component of the at least one switch device and/or of the at least one sensor can thus be adjusted.

The at least one adapter can have at least one adjustment device, with which a position of the two fastening interfaces relative to one another in the height direction can be adjusted. The spacing between the at least one installation device and the at least one switch device and/or the at least one sensor or the at least one component of the at least one switch device and/or of the at least one sensor can thus be adjusted by the adjustment device.

The at least one installation device can be formed substantially flat or substantially bridge-shaped in a cross-section.

The at least one installation device can have a first installation interface for fastening, preferably detachably, the at least one installation device to a first side wall of the furniture carcass and a second installation interface for fastening, preferably detachably, the at least one installation device to a second side wall of the furniture carcass spaced apart from the first side wall. The installation interfaces are preferably shaped such that they can be installed on a front face of the side walls.

The spacing between the first and second side walls can thus be bridged by the at least one installation device. The two side walls are thereby held to one another. The at least one switch device and/or the at least one sensor or at least one component of the switch device can thereby also be installed between the two side walls on the at least one installation device, preferably by means of adapters.

In an embodiment, the at least one support has a support head arranged in an end region in the longitudinal direction of the at least one support, wherein the at least one switch device and/or the at least one sensor or at least one component of the at least one switch device and/or of the at least one sensor is or can be arranged on the support head.

The support head can be mounted displaceably, preferably to a limited extent, at least in the longitudinal direction of the at least one support relative to a main body of the at least one support.

The support head can have at least one parking position for at least one carriage that can be connected to the at least one door leaf.

The carriage can be guidable on a further guiding rail, which is preferably arranged transverse to the support-guiding rail. The carriage can be connectable to the at least one door leaf and/or to at least one further door leaf.

The support head is or can be mounted displaceably on at least one head-guiding rail, wherein the at least one head-guiding rail is or can be arranged parallel to the at least one support-guiding rail. The support head can thus be additionally supported.

The at least one switch device and/or the at least one sensor or at least one component of the at least one switch device and/or of the at least one sensor can be fastened, preferably detachably, to the support head via fastening means.

The fastening means can be formed as screws and/or comprise at least one catch means. A simple connection is made possible by screws. A connection without tools is made possible by catch means.

The fastening means can be formed in such a way that the at least one switch device and/or the at least one sensor or the at least one component of the at least one switch device and/or of the at least one sensor can be fastened to the support head by means of an installation movement substantially transverse to the longitudinal direction of the at least one support.

For example, the at least one switch device and/or the at least one sensor or the at least one component of the at least one switch device and/or of the at least one sensor can be snapped into a catch means by means of an installation movement.

In an embodiment, the at least one switch device has at least one first component and at least one second component, preferably wherein the at least one first component is or can be connected in a movement-coupled manner to the at least one support and the at least one second component can be arranged fixedly relative to the at least one support-guiding rail.

The two components of the switch device can thus be brought closer to one another by the movement of the at least one support. A signal can thereby be generated by the switch device.

The at least one first component of the switch device can be formed as a magnet and the at least one second component of the switch device can be formed as a reed switch or vice versa. The reed switch can be switched by bringing the magnet closer by means of a movement of the support.

In the reed switch an electrical contact can thus be closed magnetically. Through the closing of the electrical contact an electrical signal is generated, with which the power supply to at least one electrical appliance can be interrupted and/or enabled.

The switch device can be formed as a light barrier, preferably wherein the at least one sensor is formed as a light sensor. The support and/or the door leaf can interrupt the light barrier, wherein a signal can be generated by the light sensor. The power supply to at least one electrical appliance can be interrupted and/or enabled by the signal.

At least one control device can be provided, which can be connected to the at least one switch device and/or the at least one sensor, the at least one electrical appliance and at least one power source. The power supply to at least one electrical appliance can be interrupted and/or enabled by the at least one control device as a result of a signal.

The power supply can be interrupted and/or enabled from a limit value of an electric power drawn by the electrical appliance. An electrical appliance can thus be supplied with a little power despite an interrupted power supply. A clock of an electric oven, for example, which draws little power, can thus continue to operate even when the power supply is interrupted and does not have to be reset, while heating of the electric oven, which draws a lot of electric power, is not possible.

It may be noted here that not all electrical appliances in the piece of furniture have to be able to be switched off or on by the subject-matter of this application. In the case of a refrigerator, for example, continuous operation is desirable; this would then be connected to a power source preferably decoupled from the control device.

In an embodiment, at least one further guiding rail is provided, which can be or is arranged substantially transverse to the support-guiding rail, wherein at least one carriage is provided, with which a further door leaf, which is or can be connected in an articulated manner to the at least one door leaf, which can be arranged on the at least one support, can be or is mounted on the at least one further guiding rail. A folding door consisting of two door leaves can thus be created. This is advantageous, for example, in the case of wide doors, as less space is thus taken up in front of the piece of furniture during closing and opening.

In an embodiment of the guiding arrangement, the at least two guiding systems have at least one common control device.

The power supply to at least one electrical appliance can be interrupted and/or enabled:

by at least one signal from at least one guiding system, and/or by at least one signal each from the at least two guiding systems.

It can be sufficient that only one door leaf of several door leaves is in at least one predetermined, in particular open, position in order to interrupt and/or enable the power supply to at least one electrical appliance.

It can be required that the at least two door leaves are in at least one predetermined, in particular open, position in order to interrupt and/or enable the power supply to at least one electrical appliance. The at least two door leaves thus have to be opened properly.

In an embodiment of a guiding arrangement, a folding door consisting of two door leaves is combined with a further folding door and/or a non-folding door consisting of one door leaf. Solutions can thus be realized flexibly for different pieces of furniture.

In an embodiment of the piece of furniture, at least one shaft-shaped cavity is provided, in which the at least one door leaf can be sunk. The door leaf is thus tidied away in the open state.

The guiding device and other mechanisms can be arranged in the cavity for aesthetic reasons.

The at least one switch device and/or the at least one sensor or the at least one interface can be positioned or positionable relative to the furniture carcass in such a way that the at least one switch device and/or the at least one sensor can be switched and/or triggered in a, preferably completely, sunken position of the at least one door leaf in the cavity. It can be provided, for example, that the door leaf must be sunk in the cavity in order that an electrical appliance can draw power.

BRIEF DESCRIPTION OF THE DRAWINGS

Further preferred embodiments are described with reference to the following figures. There are shown in.

DETAILED DESCRIPTION OF THE INVENTION

Figure 1A:
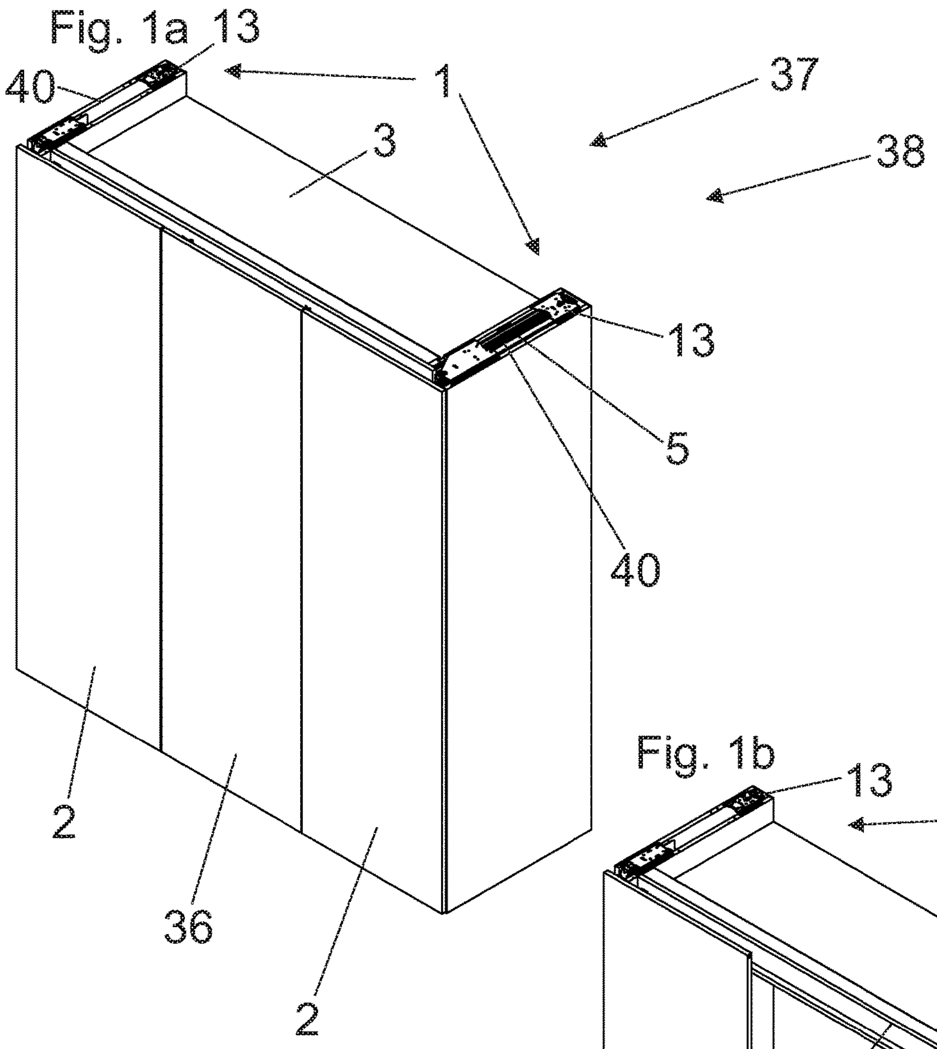
FIGS. 1*a,b* show a piece of furniture with a guiding arrangement with two guiding systems with a. closed door leaves and b. one open door leaf.
Figure 1B:
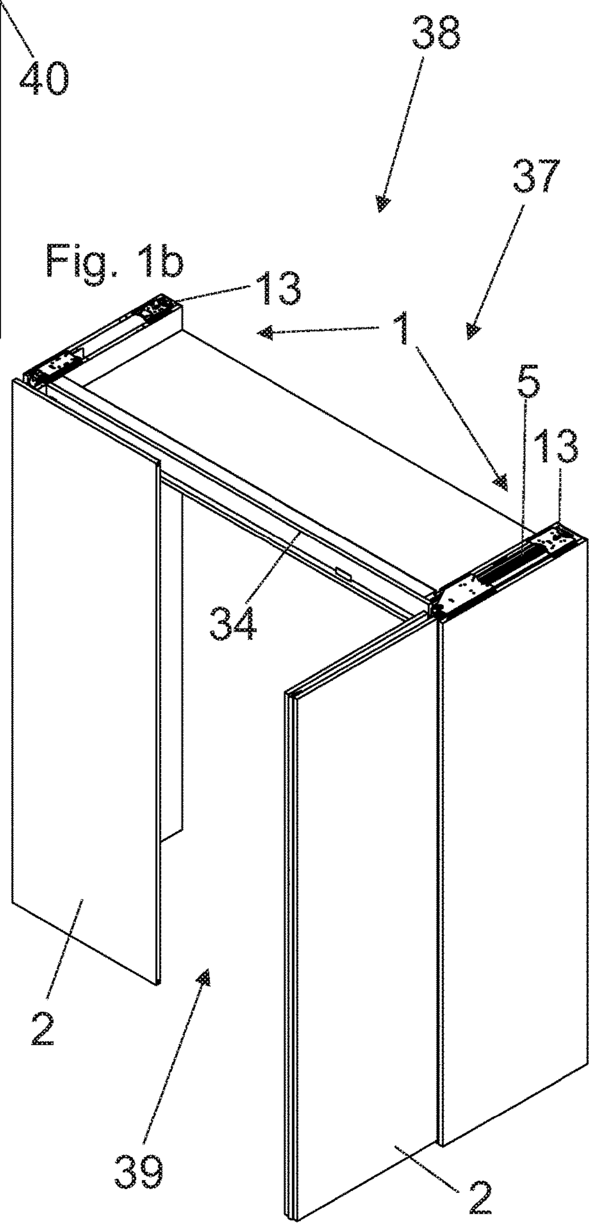

FIGS. 1*a* and 1*b* show a piece of furniture 38 with a furniture carcass 3 and with a guiding arrangement 37. The guiding arrangement 37 comprises two guiding systems 1. The piece of furniture 38 has two doors comprising three door leaves 2, 36. A first single-leaf door consists of a door leaf 2 and a second double-leaf door consists of a double door leaf. The double door leaf has one door leaf 3 and a further door leaf 36. The further door leaf 36 is connected in an articulated manner to the door leaf 2. A support 4 is arranged on the door leaves 2 (this support 4 cannot be seen in FIGS. 1*a* and 1 *b*).

In FIG. 1*a* all door leaves 2, 36 are closed, while in FIG. 1*b* the double door leaf is open.

In addition to the at least one door leaf 2, the piece of furniture 38 has a furniture carcass 3. The furniture carcass 3 has at least one interior 39, and the at least one interior 39 can be covered, at least in areas, by the at least one door leaf 2. At least one electrical appliance 11 can be arranged in the interior 39, and the electrical appliance 11 is not represented in FIG. 1*b*.

In FIG. 1*b* a further guiding rail 34 can be seen, which is arranged substantially transverse to a support-guiding rail 5. Furthermore, at least one carriage 34 is provided, with which a further door leaf 36 can be or is mounted on the at least one further guiding rail 34.

Figure 2:
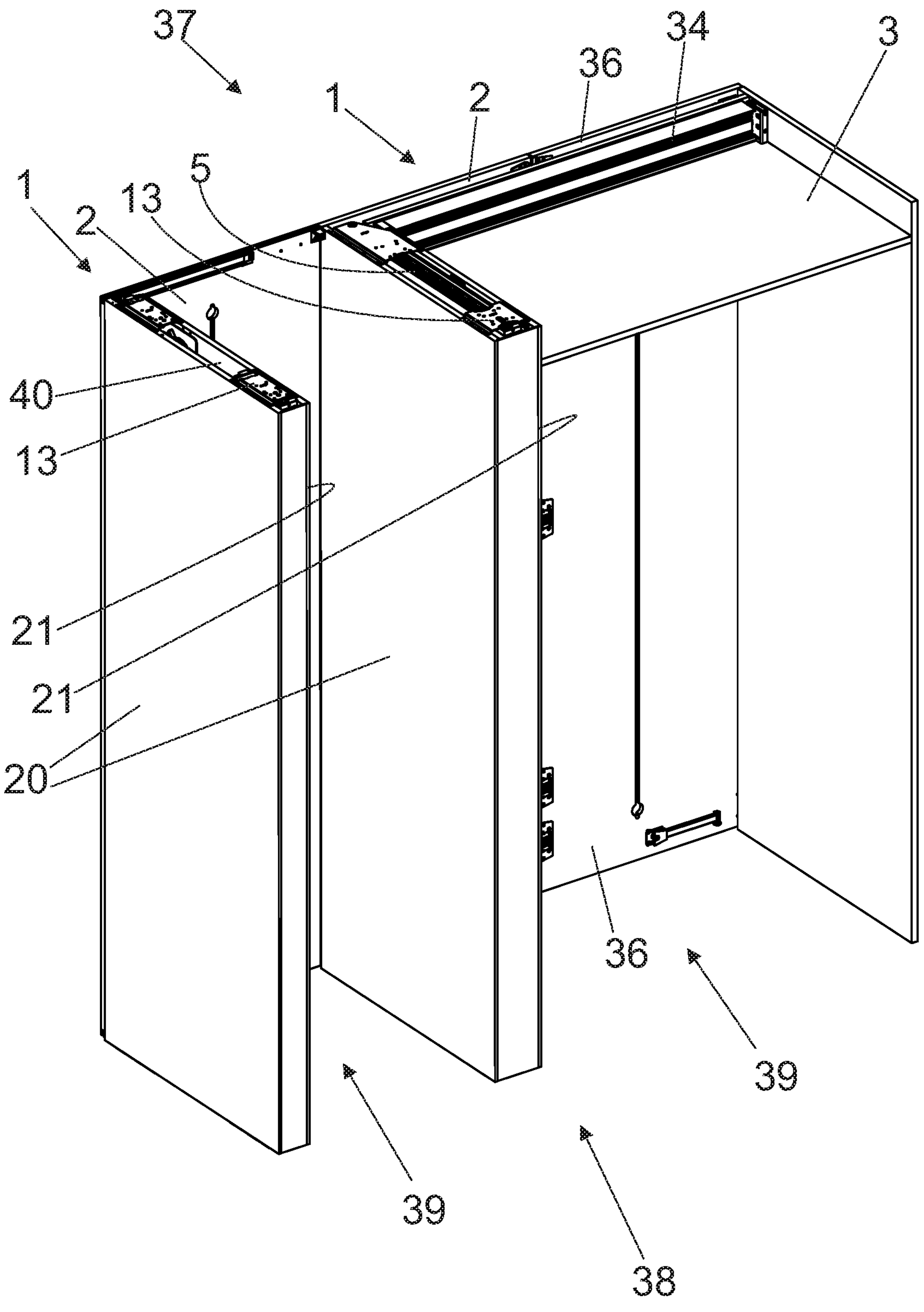
FIG. 2 shows an alternative embodiment of a piece of furniture with a guiding arrangement in a perspective rear view, FIGS. 3*a,b* are detailed views of the guiding arrangement from FIG. 2, FIGS. 4*a,b* are detailed views of the switch device of the guiding system with a. installed and b. not installed first component of the switch device.

FIG. 2 shows an alternative embodiment of a piece of furniture with a guiding arrangement 37 in a perspective rear view. As a result the interior 39 is seen, in which here furthermore no electrical appliance 11 is represented. FIG. 2 again comprises a two-leaf door and a single-leaf door. The support-guiding rails 5 are not arranged on the opposing sides of the piece of furniture 38, however, as in FIGS. 1*a* and 1 *b*.

The piece of furniture 38 comprises two shaft-shaped cavities 40, in which the door leaves 2, 36 can be sunk. The cavities are delimited by side walls 20, 21, and the side walls 20, 21 are held together by an installation device 13. The support-guiding rails 5 are located in these cavities 40.

Figure 3A:
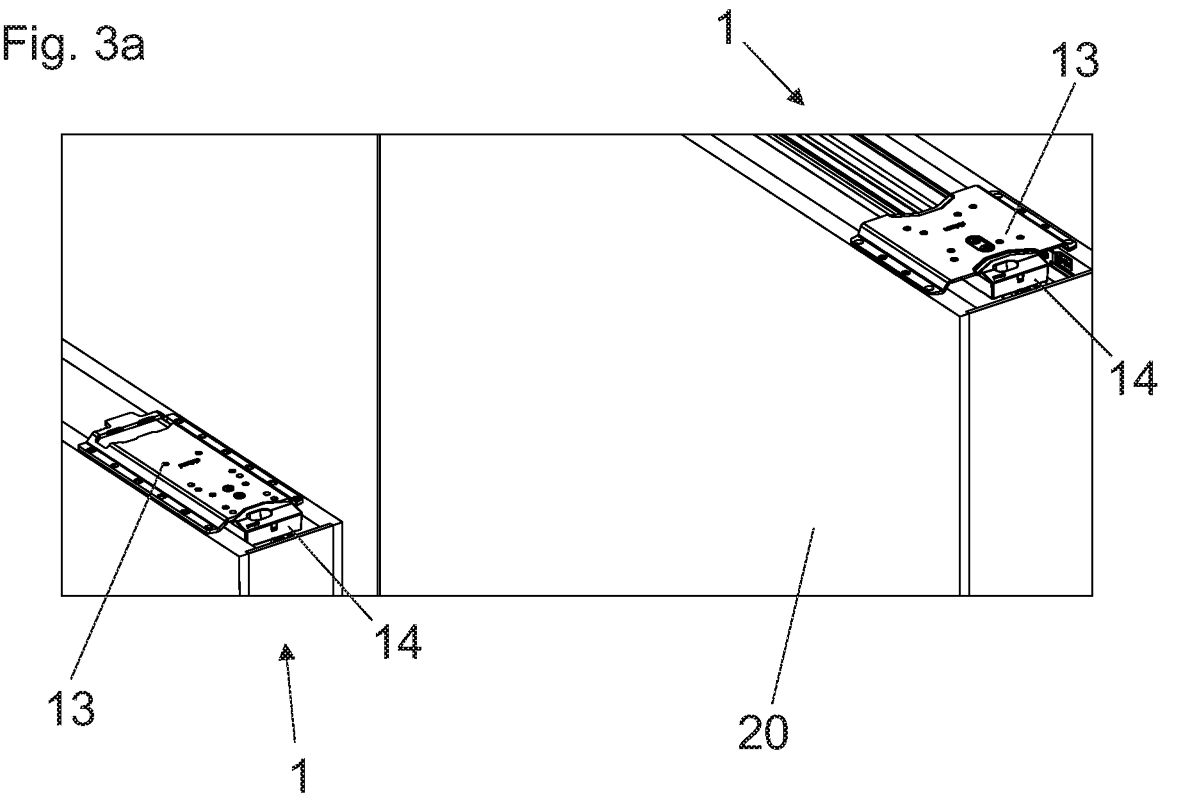
Figure 3B:
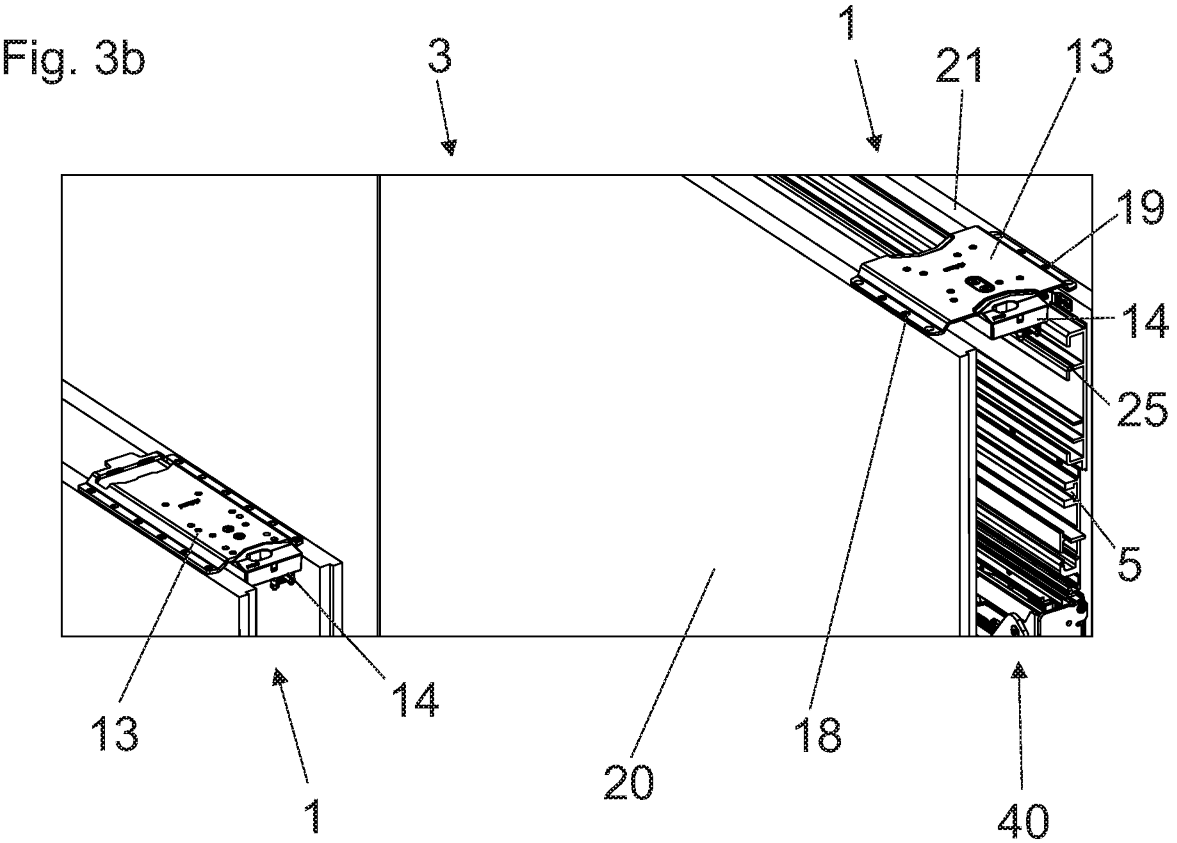

FIGS. 3*a* and 3*b* show detailed views of the guiding arrangement 37 from FIG. 2. In FIG. 3*a*, the cavities 40 are covered to the rear, while in FIG. 3*b* the cavities 40 are open to the rear.

In the right-hand cavity 40 in FIG. 3*b*, support-guiding rails 5 and head-guiding rails 25 can be seen. The guiding rails are not represented in the left-hand cavity 40 in FIG. 3*b*.

An adapter 14, which is arranged on the installation device 13 in the cavity 40, can furthermore be seen. As described further below, at least one switch device 7 and/or at least one sensor 8 can be attached to this adapter 14.

The installation device 13 is formed substantially flat or substantially bridge-shaped in a cross-section and has a first installation interface 18 for fastening, preferably detachably, the at least one installation device 13 to a first side wall 20 of the furniture carcass 3 and a second installation interface 19 for fastening, preferably detachably, the at least one installation device 13 to a second side wall 21 of the furniture carcass 3 spaced apart from the first side wall 20.

The two side walls 20, 21 are thus fixed against one another and the adapter 14 can be attached centrally in the cavity 40.

The embodiments of the following FIGS. 4*a* to 19*b* relate preferably to a guiding system 1 for single-leaf doors.

Figure 4A:
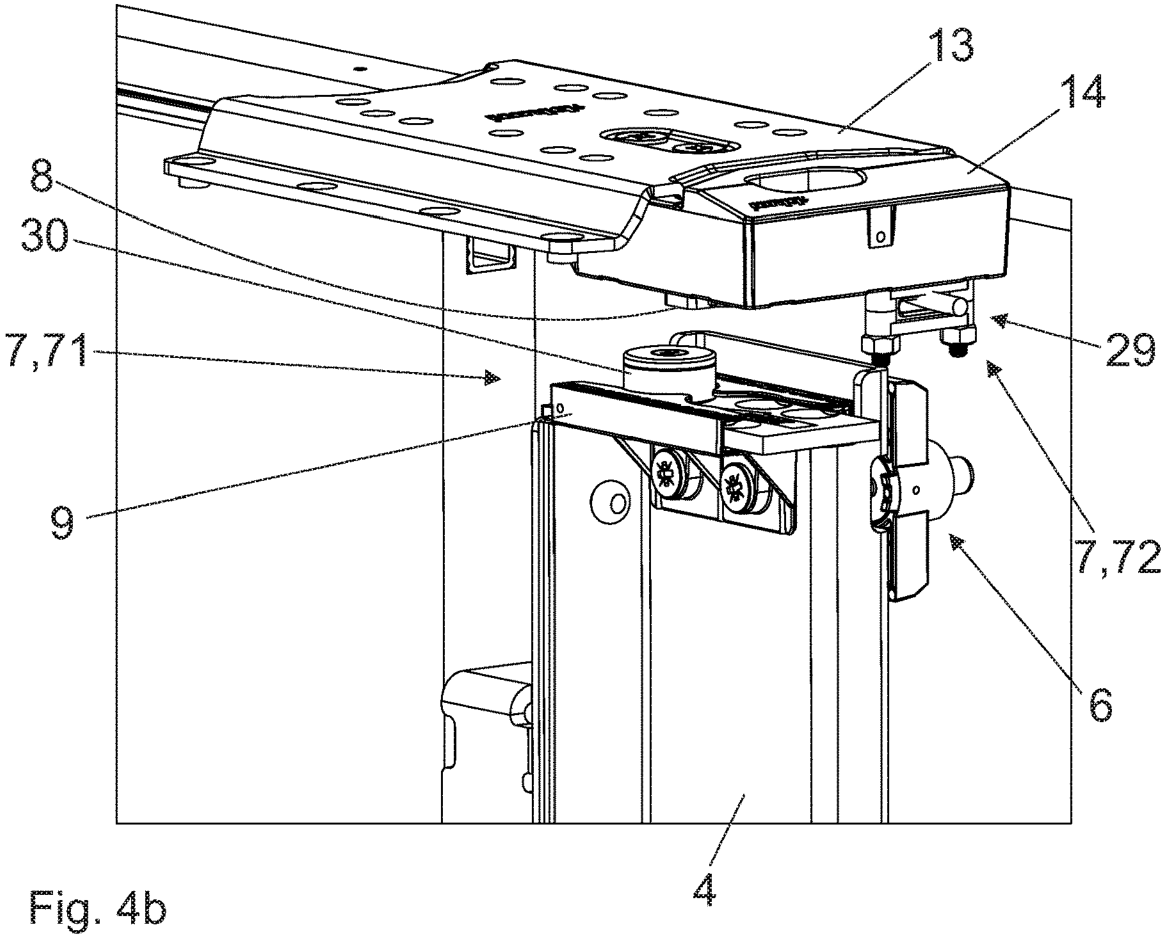
Figure 4B:
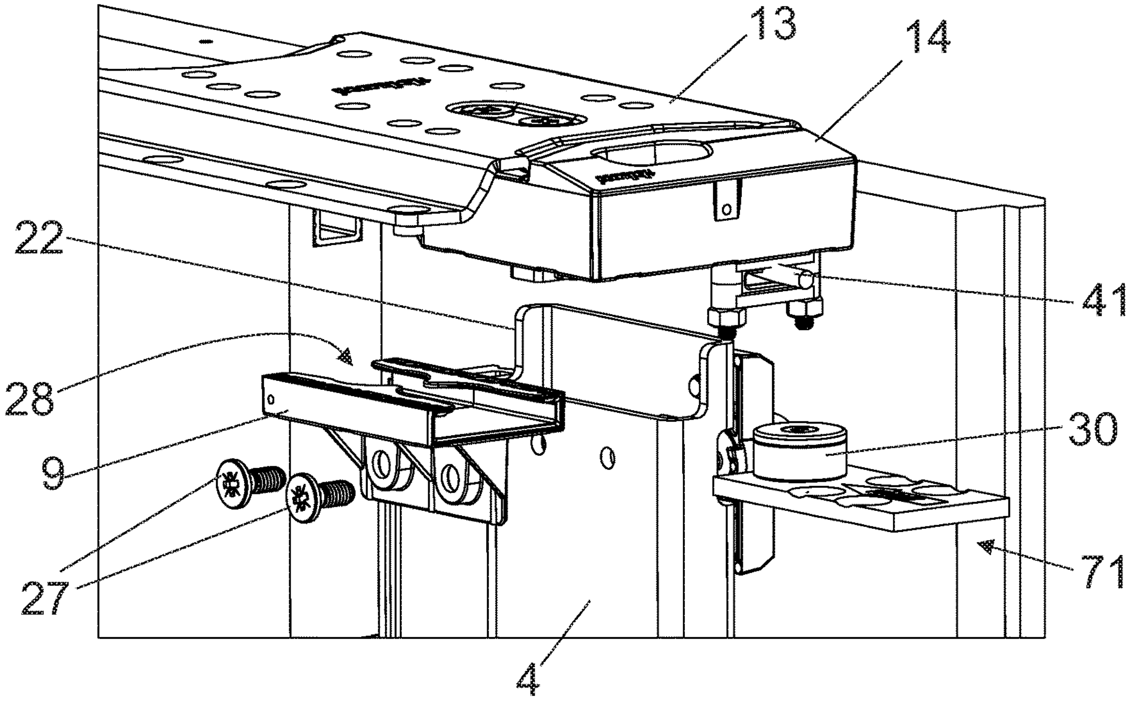

FIGS. 4*a* and 4*b* show a detailed view of the switch device 7 of the guiding system 1, wherein in FIG. 4*a* a first component 71 of the switch device 7 is installed and in FIG. 4*b* a first component 71 of the switch device 7 is not (yet) installed.

The guiding system 1 for guiding at least one door leaf 2 relative to a furniture carcass 3 comprises at least one support 4, on which the at least one door leaf 2 can be mounted, preferably in an articulated manner.

Furthermore, the guiding system 1 comprises a, preferably at least two, support-guiding rail(s) 5 (not represented for reasons of clarity), which are spaced apart from one another in a longitudinal direction of the at least one support 4. At least one guiding device 6 is provided to allow the at least one support 4 to be mounted displaceably on the at least one support-guiding rail 5, preferably in a direction substantially transverse to a longitudinal direction of the at least one support 4.

The support 4 and thus the door leaf 2 can thus be pushed along the support-guiding rail 5 into and out of the cavity 40. The (open) door leaf 2 is thus stowed in the cavity 40 and does not disrupt the overall aesthetic impression of the piece of furniture 38.

The guiding system 1 can comprise at least one switch device 7 and/or at least one sensor 8 or at least one interface 9 for fastening, preferably detachably, the at least one switch device 7 and/or the at least one sensor 8.

The at least one switch device 7 and/or the at least one sensor 8 are/is formed to generate at least one signal 10, with which the power supply to at least one electrical appliance 11, preferably kitchen appliance 12, can be interrupted and/or enabled. For example, a kitchen appliance can be operated only when the door is open.

The at least one switch device 7 and/or the at least one sensor 8 or the at least one interface 9 are positioned relative to the at least one support-guiding rail 5 in such a way that the at least one switch device 7 and/or the at least one sensor 8 can be switched and/or triggered in at least one predetermined position of the at least one support 4 and thus of the at least one door leaf 2 relative to the at least one support-guiding rail 5.

The at least one predetermined position can be an end position of the at least one support 4 relative to the at least one support-guiding rail 5. This predetermined position is occupied in FIGS. 4*a* and 4*b*.

The switch device 7 and/or the sensor 8 is thus also positioned relative to the furniture carcass 3 in such a way that the at least one switch device 7 and/or the at least one sensor 8 can be switched and/or triggered in a, preferably completely, sunken position of the at least one door leaf 2 in the cavity 40.

In FIGS. 4*a* and 4*b*, the switch device 7 is implemented as two components 71, 72. The switch device 7 accordingly has a first component 71 and a second component 72. The first component 71 is connected here in a movement-coupled manner to the support 4 and the second component 72 can be arranged fixedly relative to the at least one support-guiding rail 5.

The first component 71 of the switch device 7 is formed as a magnet 30 and the second component 72 of the switch device 7 is formed as a reed switch 29. By moving the support 4 with the magnet 30 into the proximity of the reed switch 29, the reed switch 29 is switched, in particular a signal 10 is emitted, which then switches the power supply to the electrical appliances 11 on or off.

The reed switch 29 therefore functions as a sensor 8 for the magnetic field of the magnet 30. To switch the reed switch 29, the magnet 30 must be arranged close enough to the reed switch 29.

Since the sizes of the switches can vary, it is desirable to be able to arrange the reed switches 29 flexibly. The second component 72 of the switch device 7 is therefore arranged on the installation device 13 with an adapter 14. By means of the adapter 14, the second component 72 of the switch device 7 can be installed with at least two different spacings relative to the at least one installation device 13.

In FIGS. 4*a* and 4*b*, an interface 9 for installing the first component 71 of the switch device 7 on the support head 22, which is arranged in an end region in the longitudinal direction of the support 4, can be seen. The magnet 30 can be fastened to the interface 9 via catch means 28 by means of an installation movement substantially transverse to the longitudinal direction of the at least one support 4.

The interface 9 can be fastened, preferably detachably, to the support head 22 via fasteners 26. The fasteners 26 in the present embodiment are screws 27.

Here, FIG. 4*b* shows the interface 9, fasteners 26 and the first component 71 of the switch device 7 in an exploded representation.

It may be noted here that it is also conceivable that the switch device 7 is formed as a light barrier, preferably wherein the at least one sensor 8 is formed as a light sensor.

Figure 5:
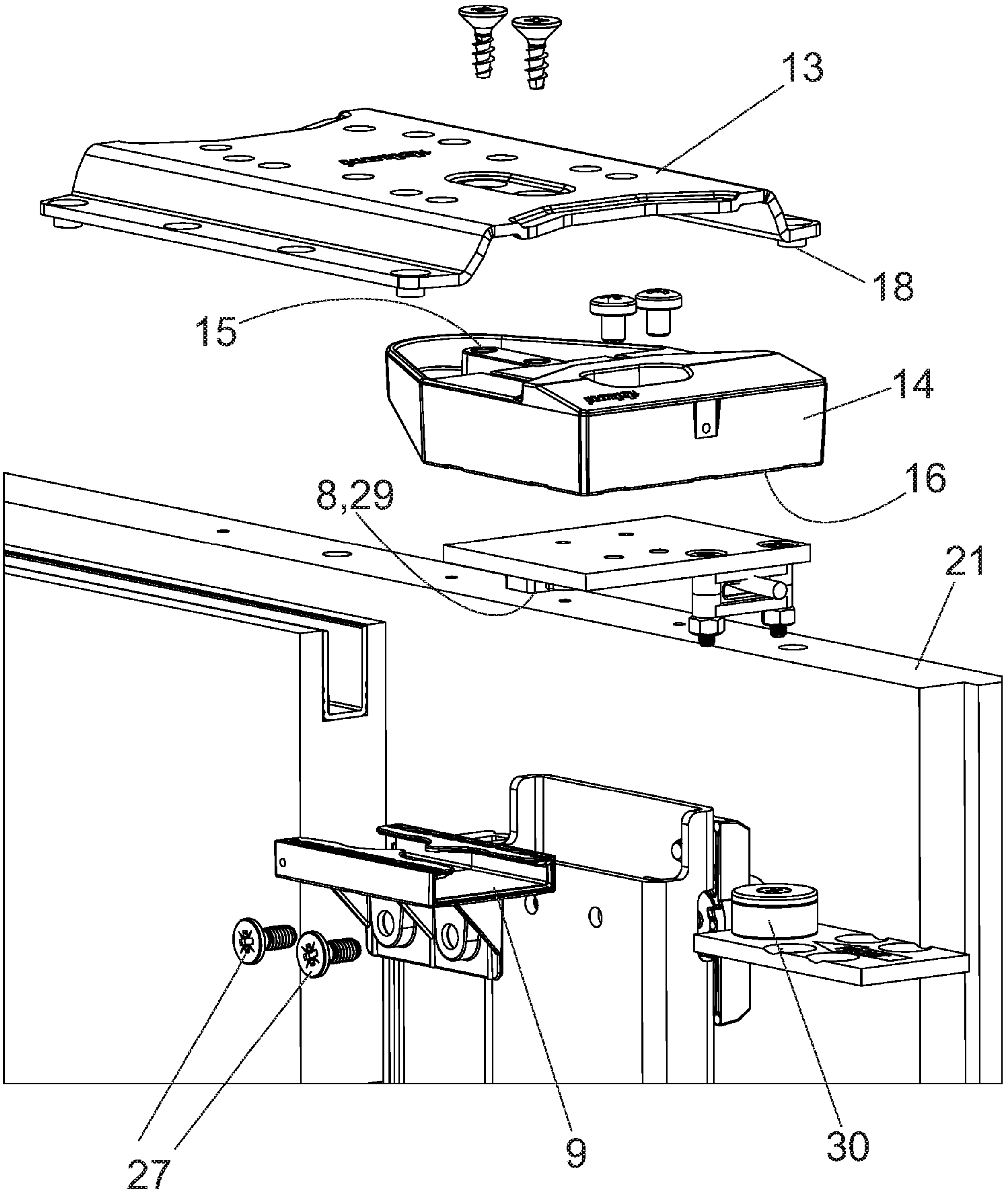
FIG. 5 is an exploded representation of a switch device, installation device and adapter, FIGS. 6*a,b* show support in a. an overall view and b. a detailed view of the first component of the switch device on the support head.

FIG. 5 shows an exploded representation of the arrangement described in FIGS. 4*a* and 4*b*.

It can be seen here that the adapter 14 has at least one first fastening interface 15 for fastening, preferably detachably, the adapter 14 to the installation device 13 and a second fastening interface 16 spaced apart therefrom in a height direction of the adapter 14 for fastening, preferably detachably, the second component 72 of the switch device 7.

Figure 6A:
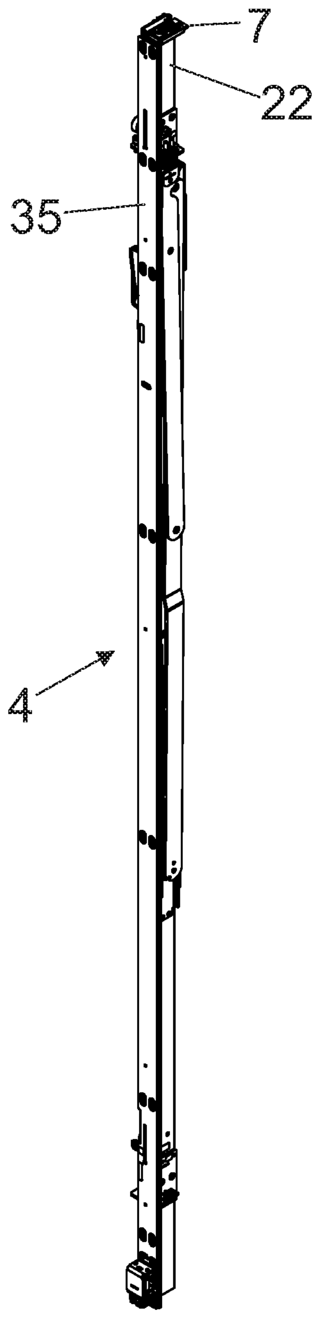

FIG. 6*a* shows a support 4 in an overall view. The support 4 comprises a hinge strip 35, with which the support 4 can be fastened, preferably in an articulated manner, to a door leaf 2. The support head 22 is arranged in an end region in the longitudinal direction of the support 4. The switch device 7, in particular the first component 71 of the switch device, is arranged on the support head 22.

Figure 6B:
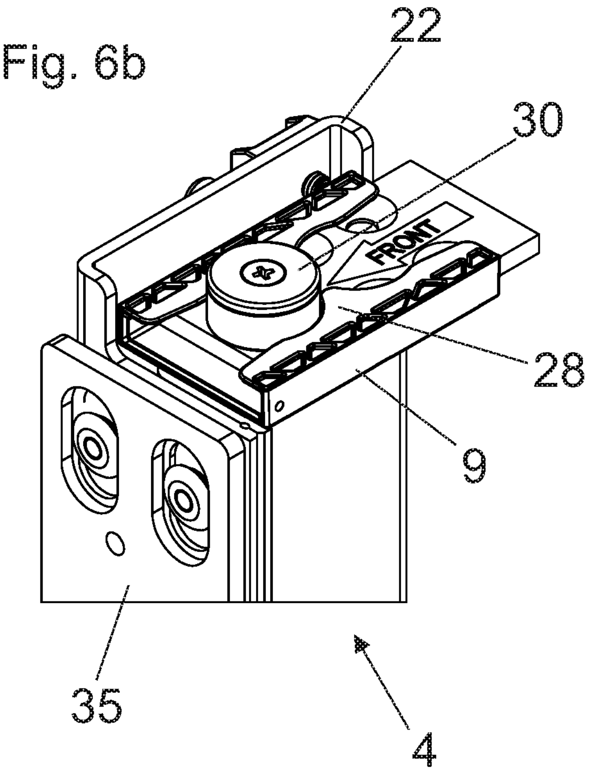

FIG. 6*b* shows a detailed view of FIG. 6*a*. The first component 71 of the switch device 7 can be seen on the support head 22. This is implemented in the same way as in the previous figures: it has an interface 9 for installation on the support head 22 by screws 27. The magnet 30 can be fastened to the interface by a catch 28.

The support head 22 is fastened to the hinge strip 35 by screws, wherein the screws 35 project through elongated holes in the hinge strip 35. Through the use of elongated holes, the height position of the support head 22 with respect to the door leaf 22 can be adjusted in a limited manner.

Figure 7A:
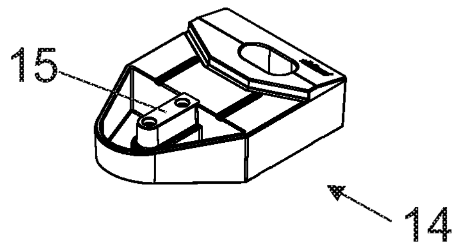
FIGS. 7*a-d* show an adapter in a. a perspective view and b. a side view and installation device in c. a perspective view and d. a side view.
Figure 8A:
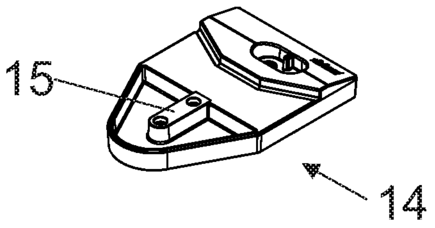
FIGS. 8*a-d* show an alternative embodiment of an adapter and an installation device in the same views as in FIGS. 7*a-d,*
Figure 7B:
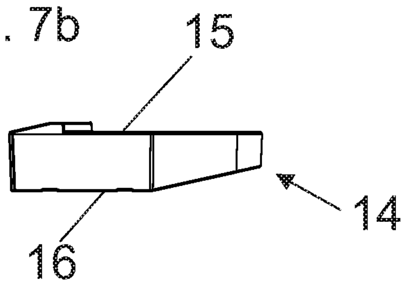
Figure 8B:
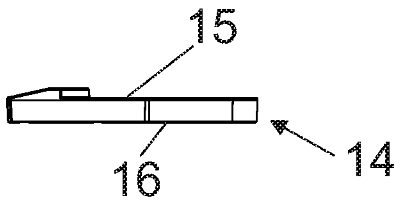

FIGS. 7*a* and 7*b* show an adapter 14 in a perspective view and in a side view. FIGS. 8*a* and 8*b* show an alternative embodiment of an adapter 14.

It can be seen in particular from FIGS. 7*b* and 8*b* that the two fastening interfaces 15, 16 of the two adapters 14 are spaced apart from one another to different extents in the height direction.

Figure 7C:
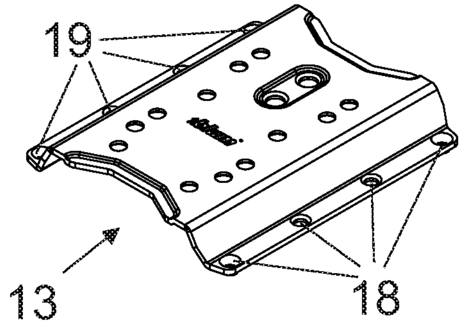
Figure 7D:
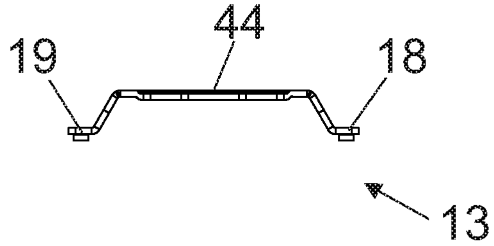

FIGS. 7*c* and 7*d* show an installation device 13 in a perspective view and in a side view. FIGS. 8*a* and 8*b* show an alternative embodiment of an installation device 13.

Figure 8C:
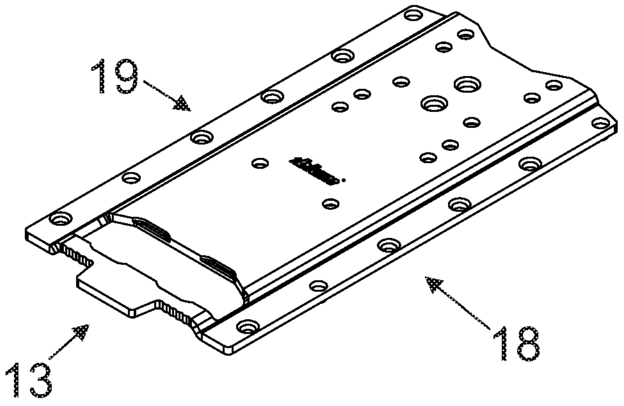
Figure 8D:
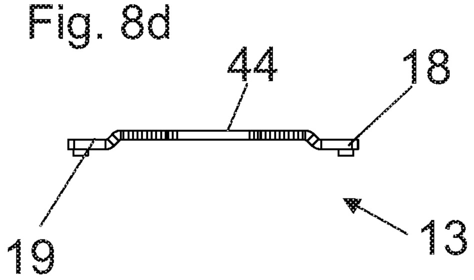

It can be seen in particular from FIGS. 7*d* and 8*d* that the bridge part 44 of the installation devices 13 are spaced apart from the installation interfaces 18, 19 to different extents in the height direction. In other words: the bending of the bridge parts 44 of the two installation devices 13 is pronounced to different degrees.

It may be noted here that the installation device 13 from FIGS. 7*c* and 7*d* corresponds substantially to the embodiments in FIGS. 4*a*, 4*b* and 5, while the installation device 13 from FIGS. 8*c* and 8*d* corresponds substantially to the embodiments in FIGS. 11*a* to 14*b* and FIGS. 16*a* to 18.

Figure 9A:
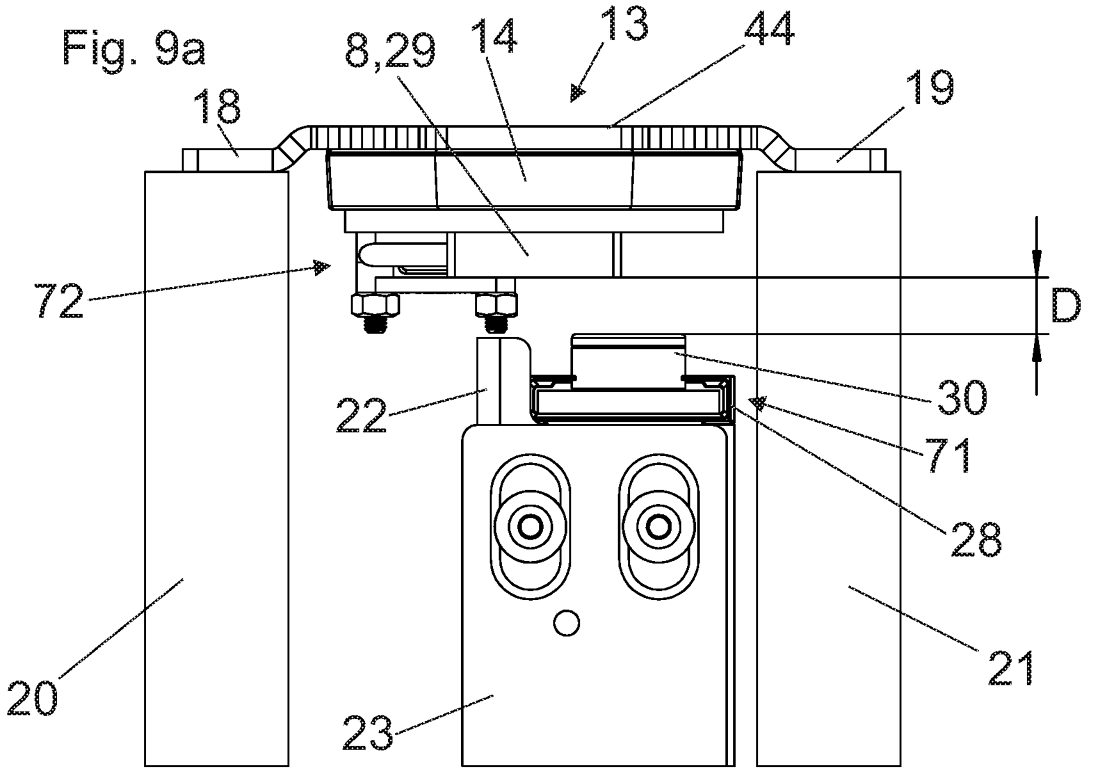
FIGS. 9*a,b* show a switch device, adapter and installation device in an installed state according to the embodiment a. from FIGS. 8*a-d* and b. from FIGS. 7*a-d,*

FIG. 9*a* shows a switch device 7, an adapter 14 and an installation device 13 in the installed state, wherein the adapter 14 and the installation device 13 are implemented according to the embodiment from FIGS. 8*a-d*.

Figure 9B:
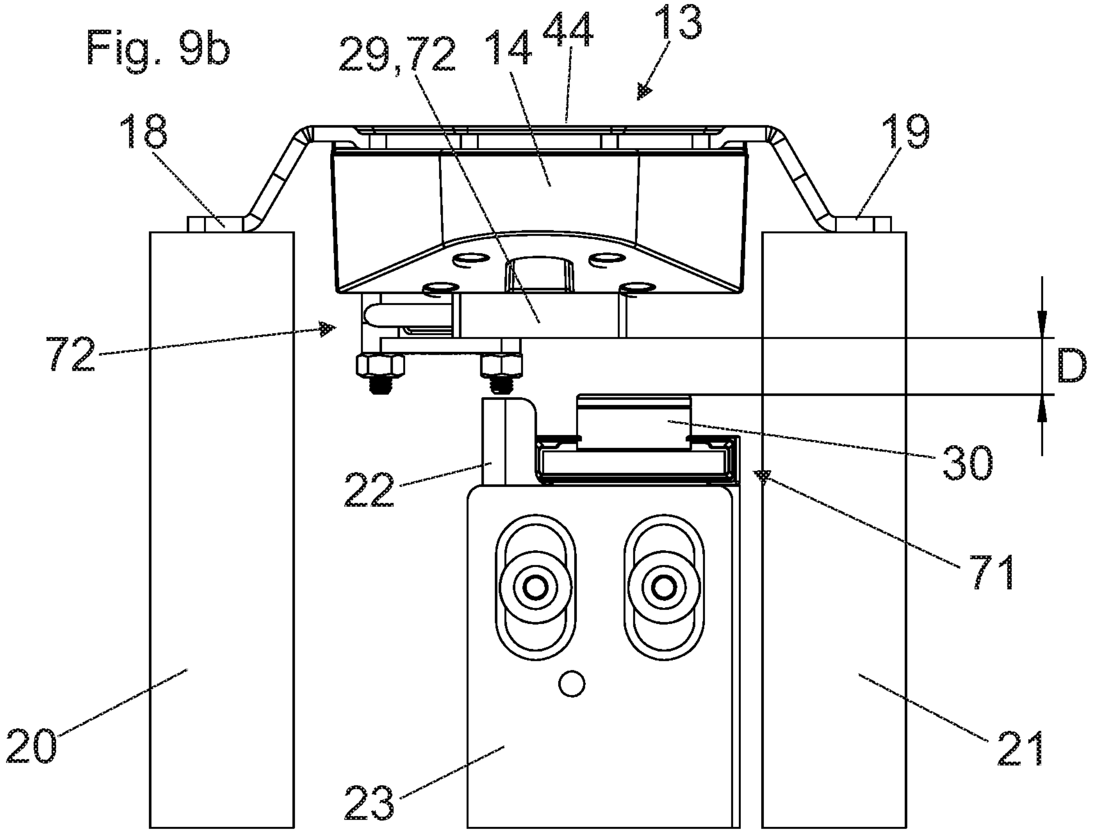

FIG. 9*b* shows a switch device 7, an adapter 14 and an installation device 13 in the installed state, wherein the adapter 14 and the installation device 13 are implemented according to the embodiment from FIGS. 7*a-d*.

The spacing D between the two components 71, 72 of the switch device 7 is the same in FIGS. 9*a* and 9*b* despite the different implementation of the installation device 13. This is desirable for the switching of the switch device 7 to function well, as optimal strength of the magnetic field for switching the reed switch 29 is achieved with the spacing between the magnet 30 of the first component 71 of the switch device 7 and the reed switch 29 of the second component 72 of the switch device 7.

The same spacing D in FIGS. 9*a* and 9*b* is achieved through the use of two different adapters 14. Through the selection from a group of at least two adapters 14, the two fastening interfaces 15, 16 of which are spaced apart from one another to different extents in the height direction, the different spacing between the bridge part 44 and the installation interfaces 18, 19 of the installation device 13 in the height direction is compensated for.

Figure 10:
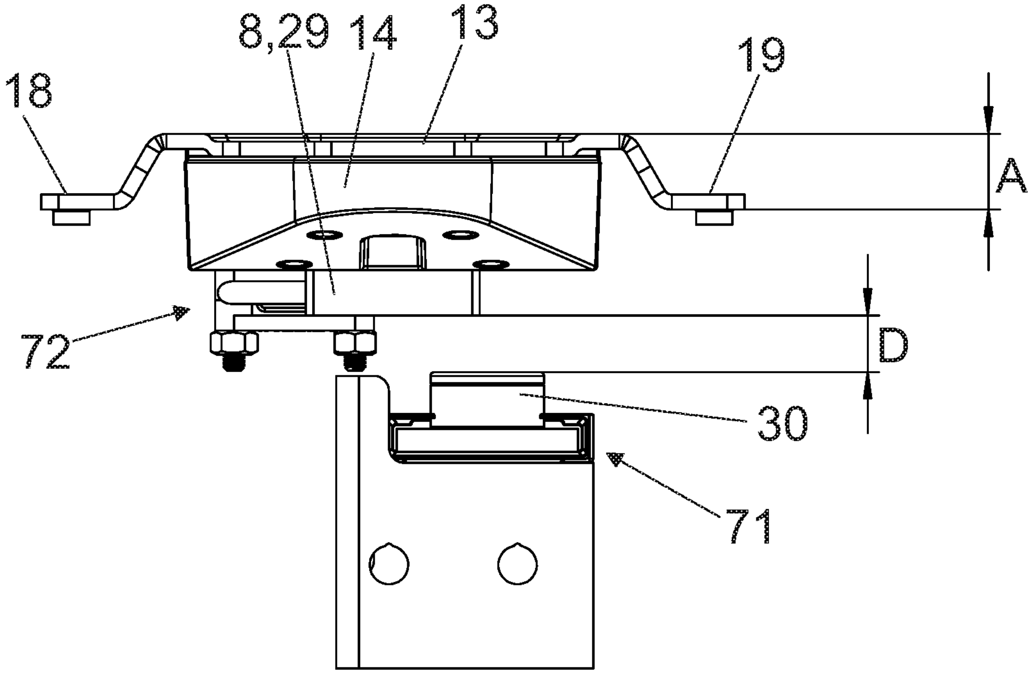
FIG. 10 show a switch device, adapter and installation device in an installed state without side walls of the piece of furniture, FIGS. 11*a,b* show a second component of the switch device, adapter and installation device a. in the state installed on the side walls and b. without side walls.

The spacing between the bridge part 44 and the installation interfaces 18, 19 of the installation device 13 in the height direction can be seen in FIG. 10 and is labeled A. It can be clearly seen from this how the spacing D can be kept constant through the choice of the adapter 14.

It may be noted here that the adapter 14 can have an adjustment device 17, with which a position of the two fastening interfaces 15, 16 relative to one another in the height direction can be adjusted. It would thus not be necessary to choose between several non-adjustable adapters 14.

The following FIGS. 11*a* to 19*b* show a further embodiment of a guiding system 1, in particular for single-leaf doors.

Figure 11A:
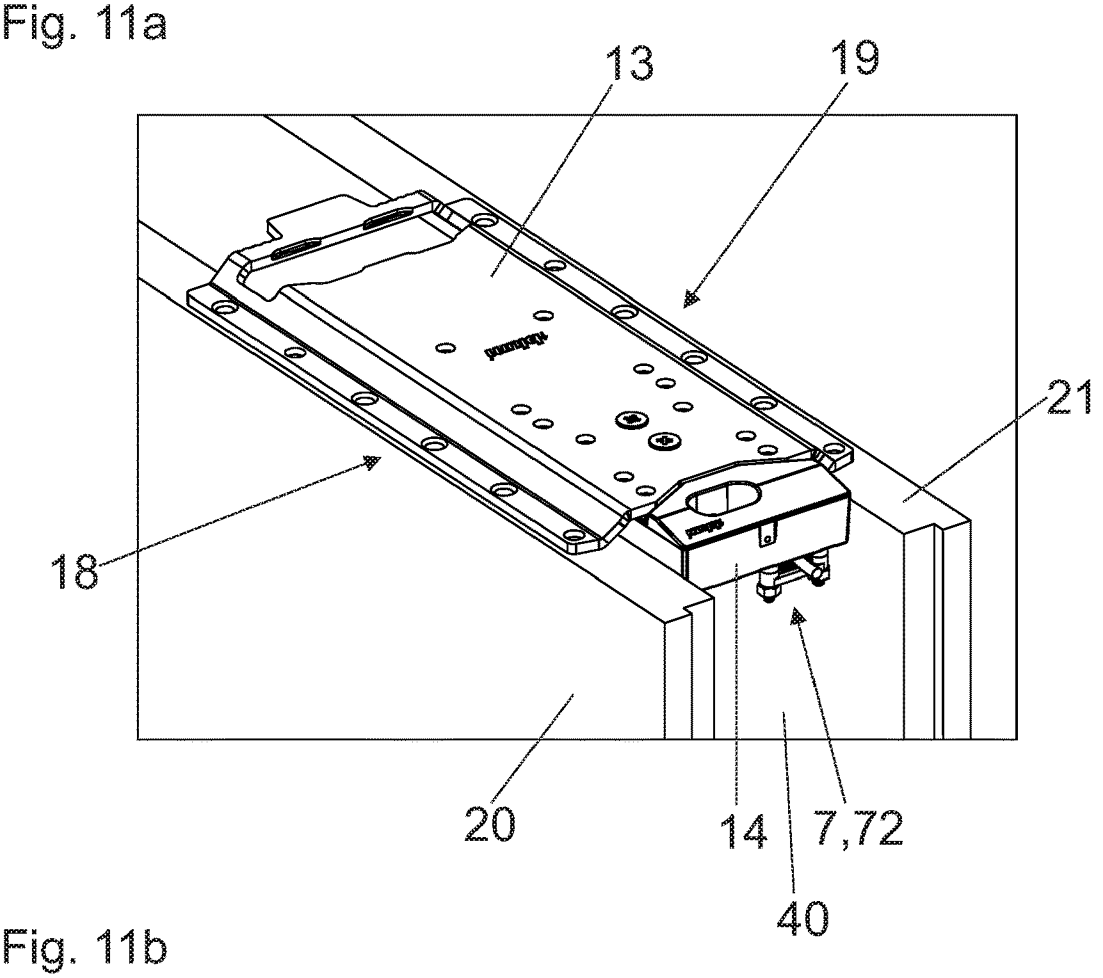

FIG. 11*a* shows the second component 72 of the switch device 7, an adapter 14 and an installation device 13 in the state installed on the side walls 20, 21. Due to the installation of the second component 72 on the installation device 13 and the adapter 14, the second component 72 is arranged in the cavity 40 between the two side walls 20, 21.

Figure 11B:
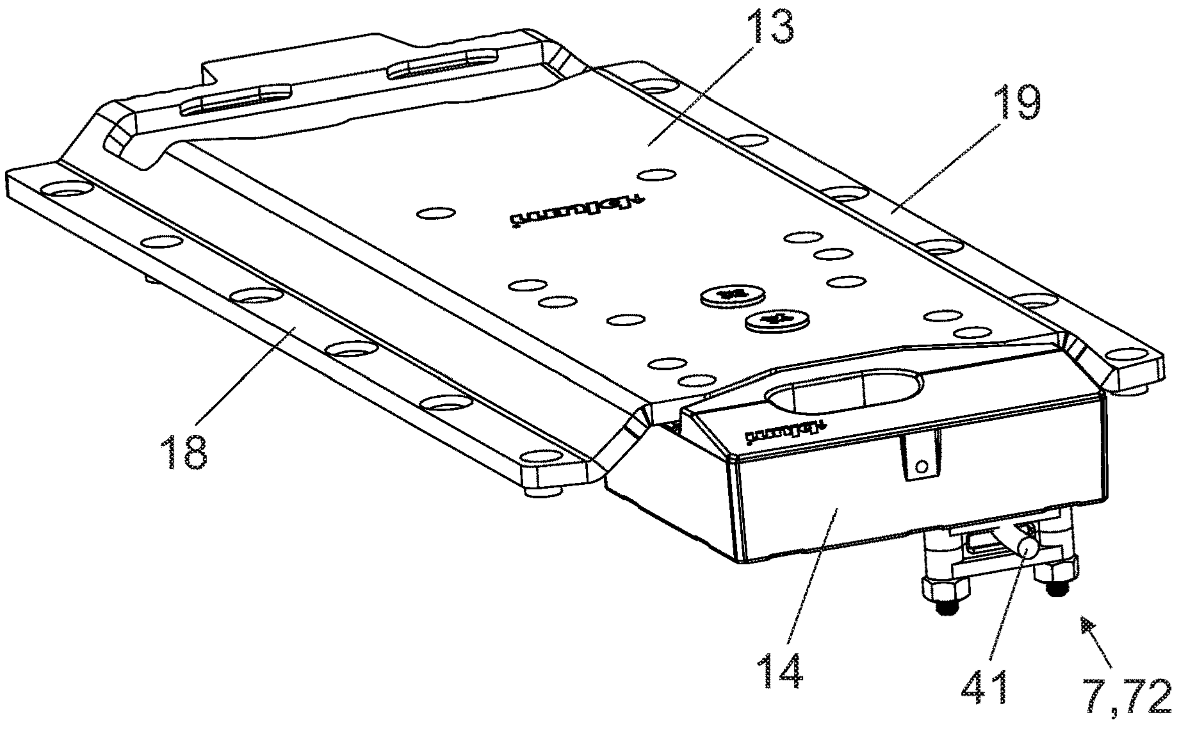

FIG. 11*b* shows a similar view to FIG. 11*a*, without side walls 20, 21. The cable 41 which leads away from the switch device 7 can be seen here. Via this cable 41 signals 10 can be transmitted, which cause the power supply to an electrical appliance 11 to be switched off.

Figure 12:
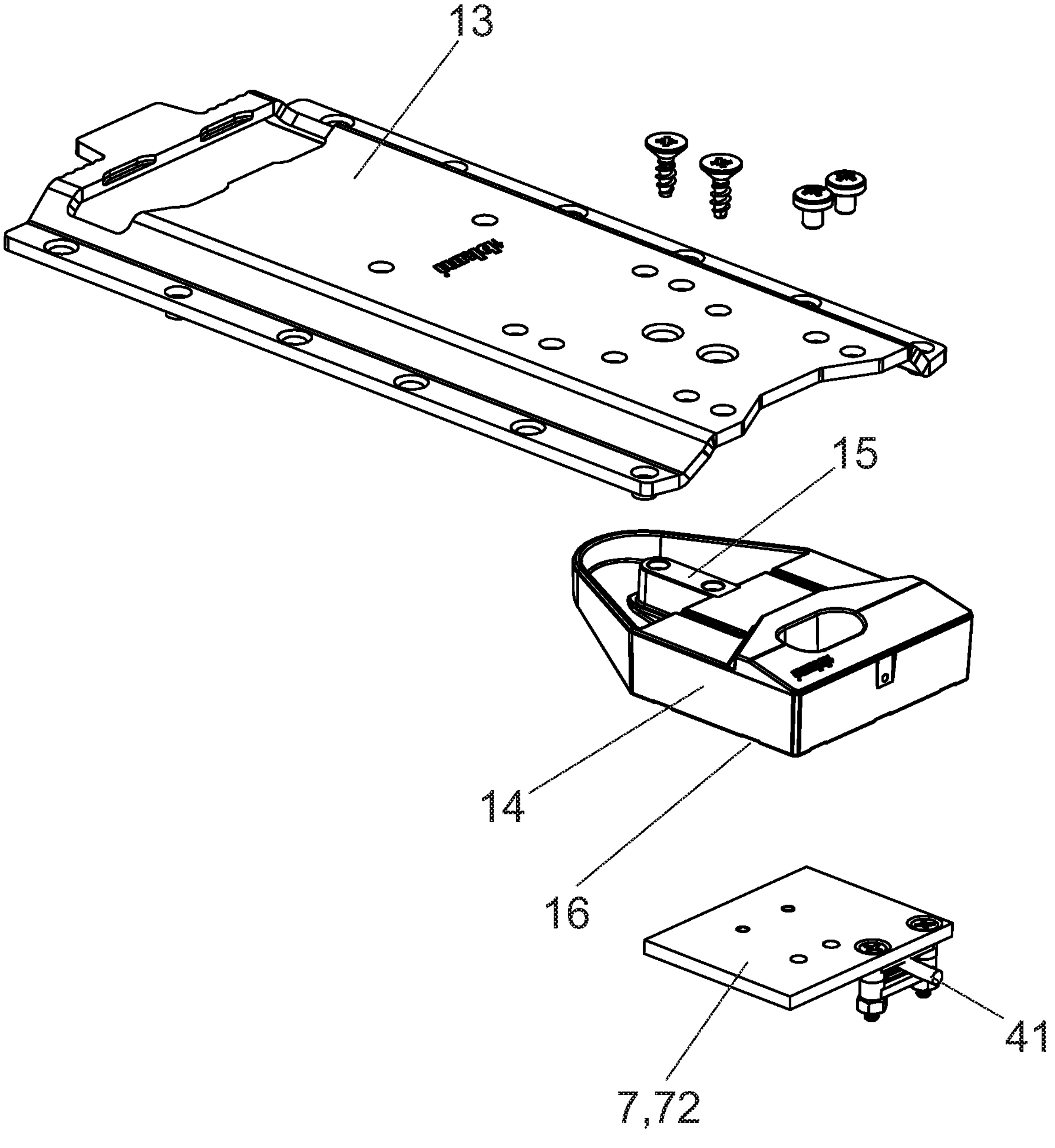
FIG. 12 is exploded representation of a second component of the switch device, adapter and installation device, FIGS. 13*a,b* is an alternative view from underneath of FIG. 11*b* with a. installed and b. not installed second component of the switch device, FIGS. 14*a,b* are views similar to FIG. 4*a* with the installation device and the adapter from FIGS. 8*a-d* a. with side wall and b. with side wall hidden.

FIG. 12 shows an exploded representation of the second component 72 of the switch device 7, adapter 14 and installation device 13.

Figure 13A:
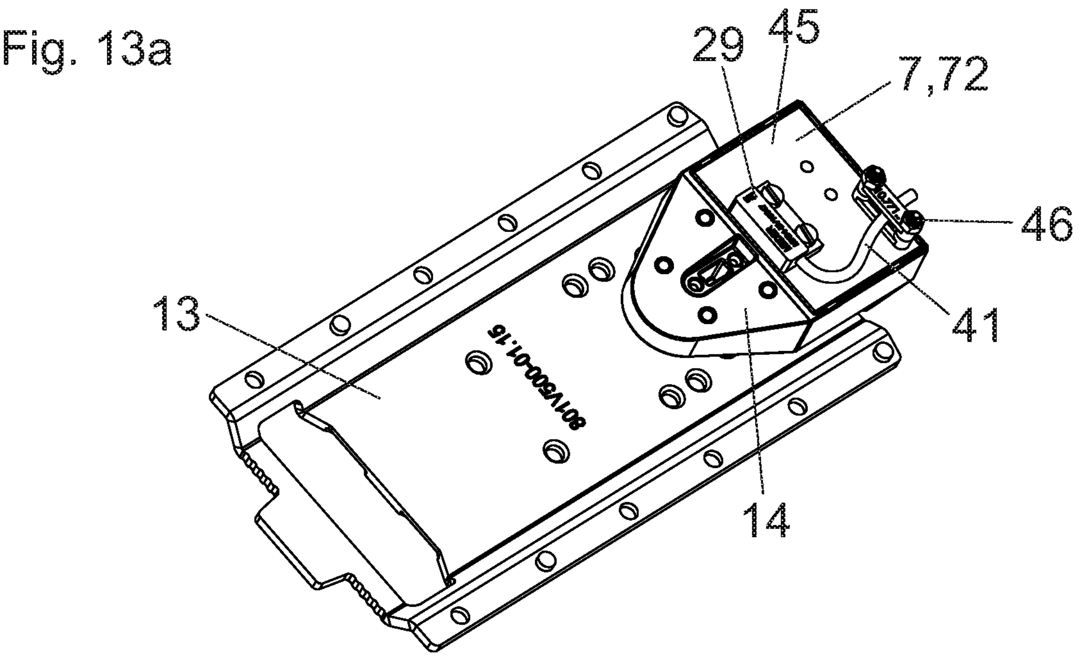

FIG. 13*a* shows an alternative view of FIG. 11*b* from underneath. It can be seen here that the second component 72 of the switch device 7 has a fastening plate 45, a cable holder 46 for holding the cable 42 and a reed switch 29. The reed switch 29 contains a sensor 8 for sensing a magnetic field.

Figure 13B:
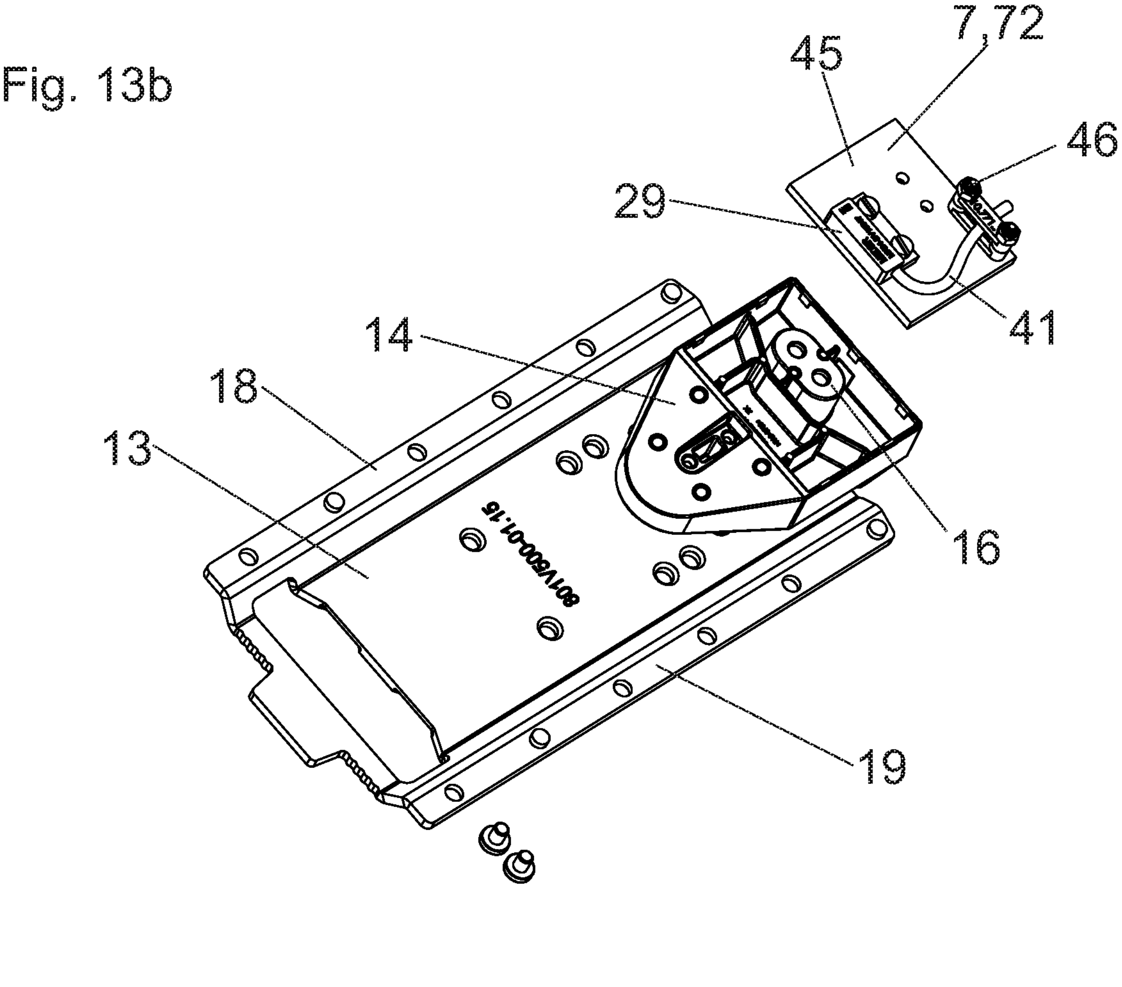

FIG. 13*b* shows the same view as FIG. 13*a*, with the second component 72 of the switch device 7 removed. The second fastening interface 16 of the adapter 14 can thereby be seen.

Figure 14A:
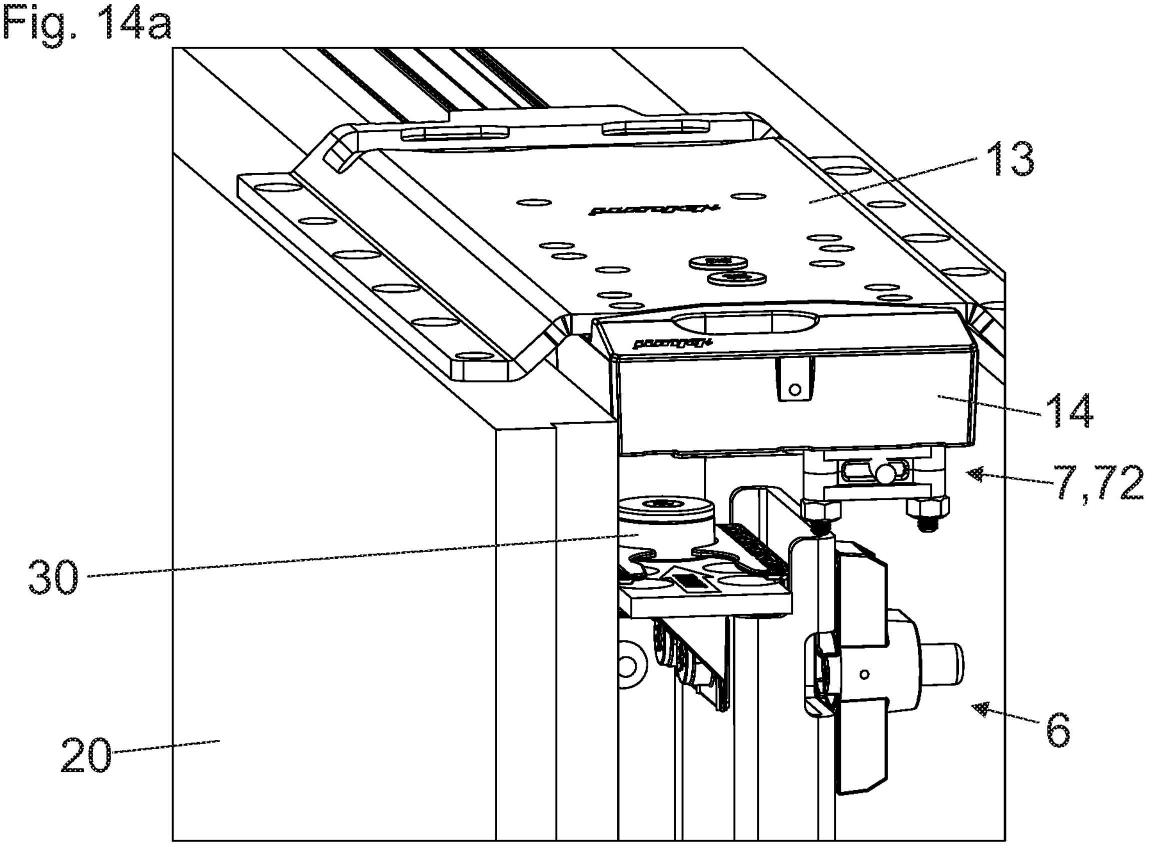
Figure 14B:
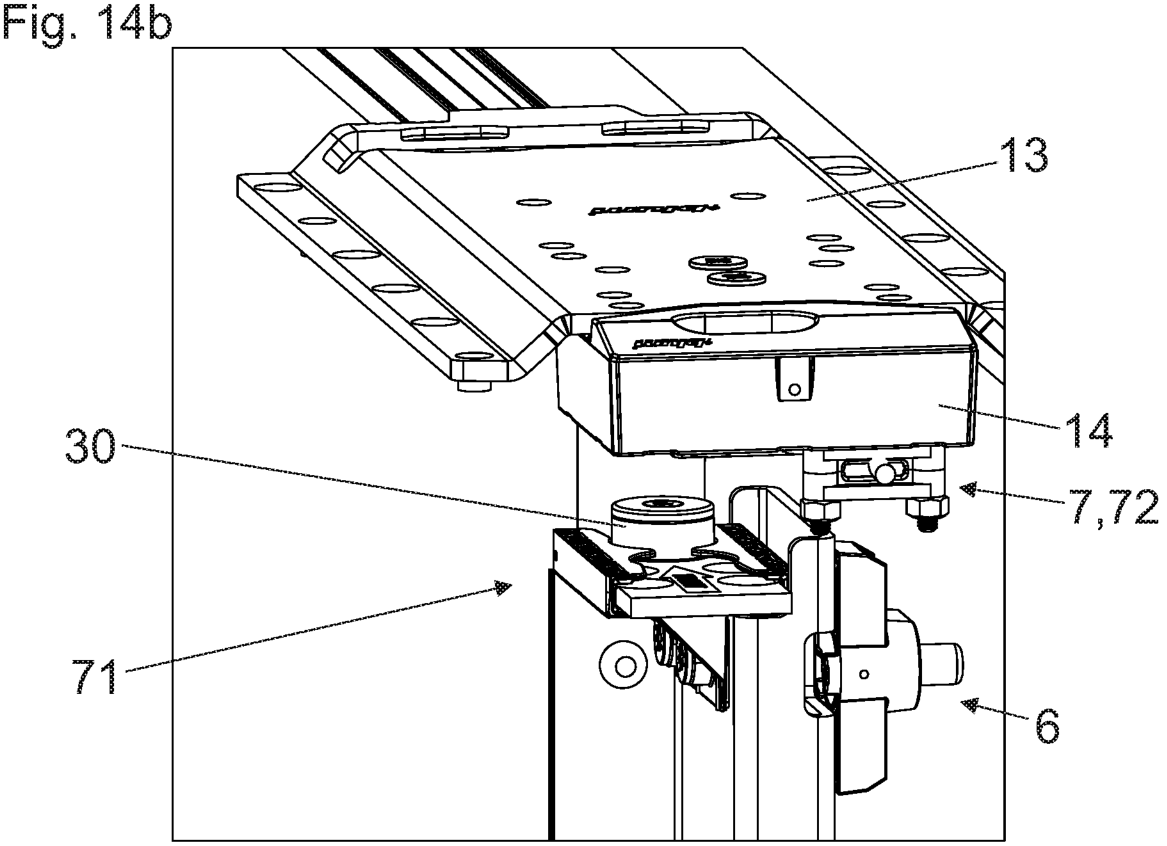

FIG. 14*a* is like FIG. 4*a*, wherein, instead of the installation device 13 and the adapter 14 from FIGS. 7*a-d*, those from FIGS. 8*a-d* are represented. The guiding device 6 can again be seen. FIG. 14*b* shows the same view as FIG. 14*a*, but with side wall 20 hidden.

Figure 15:
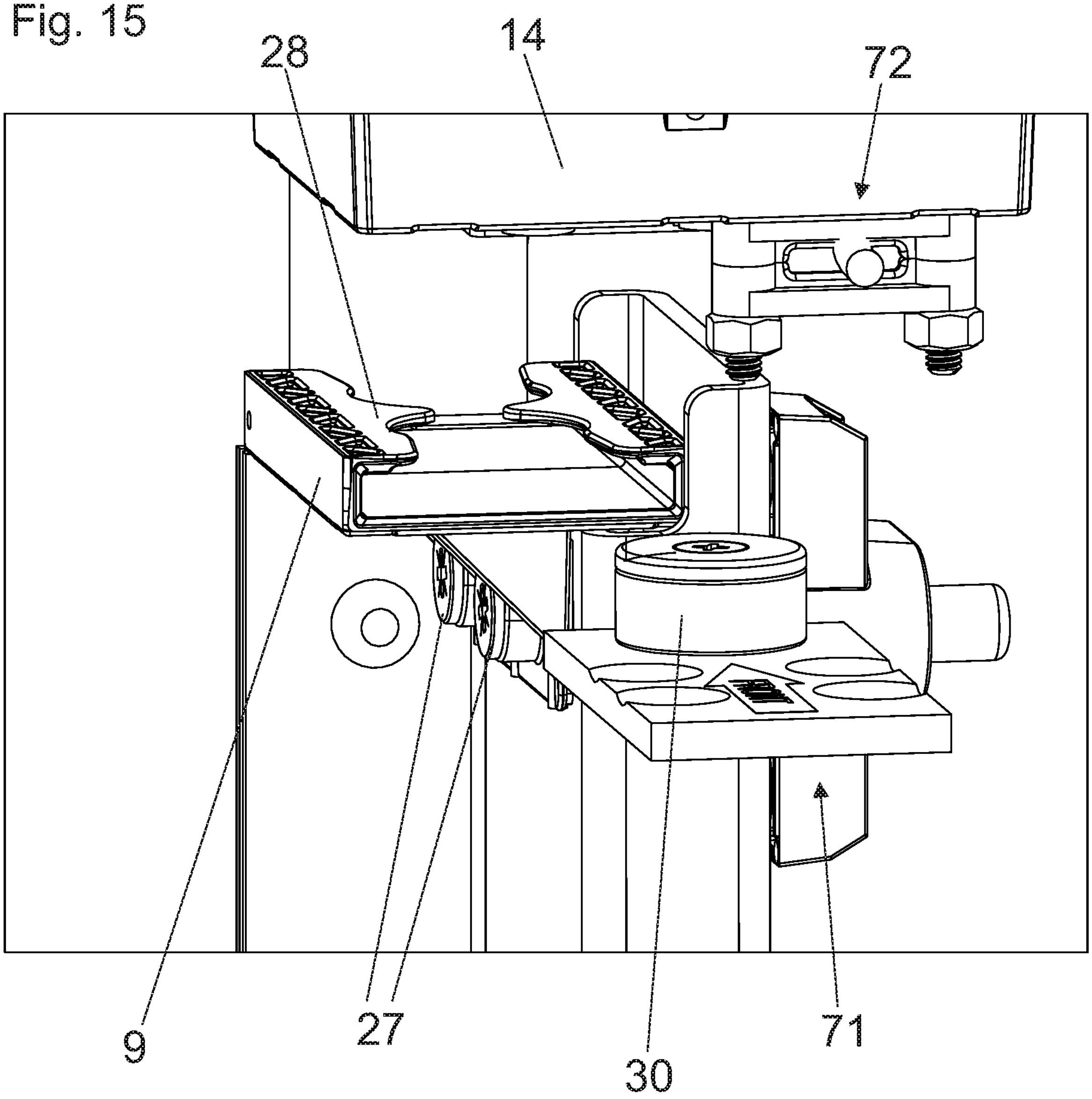
FIG. 15 shows a first component of the switch device outside an interface provided for it with catch means, FIGS. 16*a,b* show a first component of the switch device a. outside and b. inside an interface provided for it with catch means, FIGS. 17*a,b* show a switch device in a. a position predetermined for switching and b. another position.

FIG. 15 shows a detailed view of the switch device 7. The first component 71 of the switch device 7 with magnet 30 is arranged outside an interface 9 provided for it with the catch 28. The interface 9 is again fastened to the support head 22 by screws 27.

The first component 71 of the switch device 7 can be pushed manually and without tools into the interface 9, wherein it is fastened in the interface 9 by the catch 28.

Figure 16A:
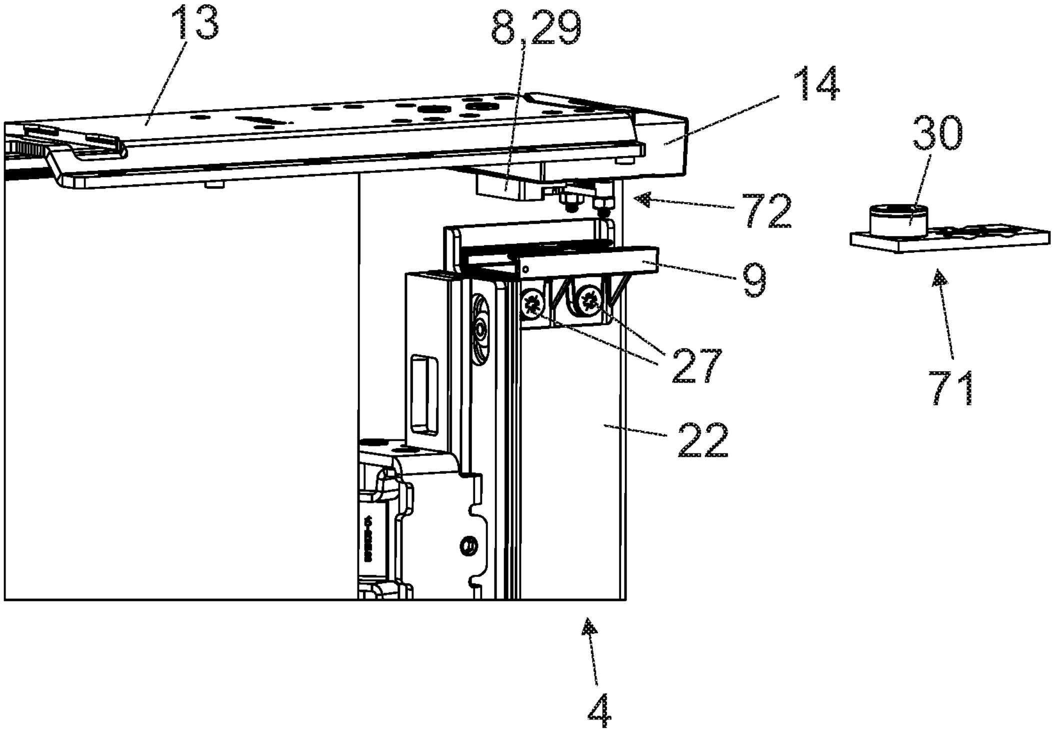
Figure 16B:
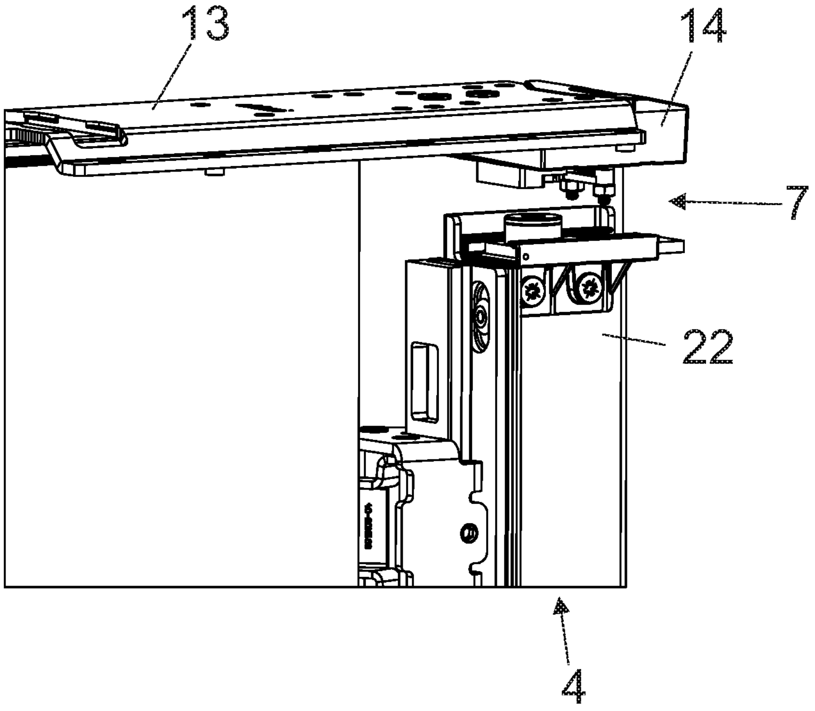

FIG. 16*a* shows another view of the arrangement in FIG. 15. In FIG. 16*b* the first component 71 of the switch device 7 is already arranged in the interface 9.

Figure 17A:
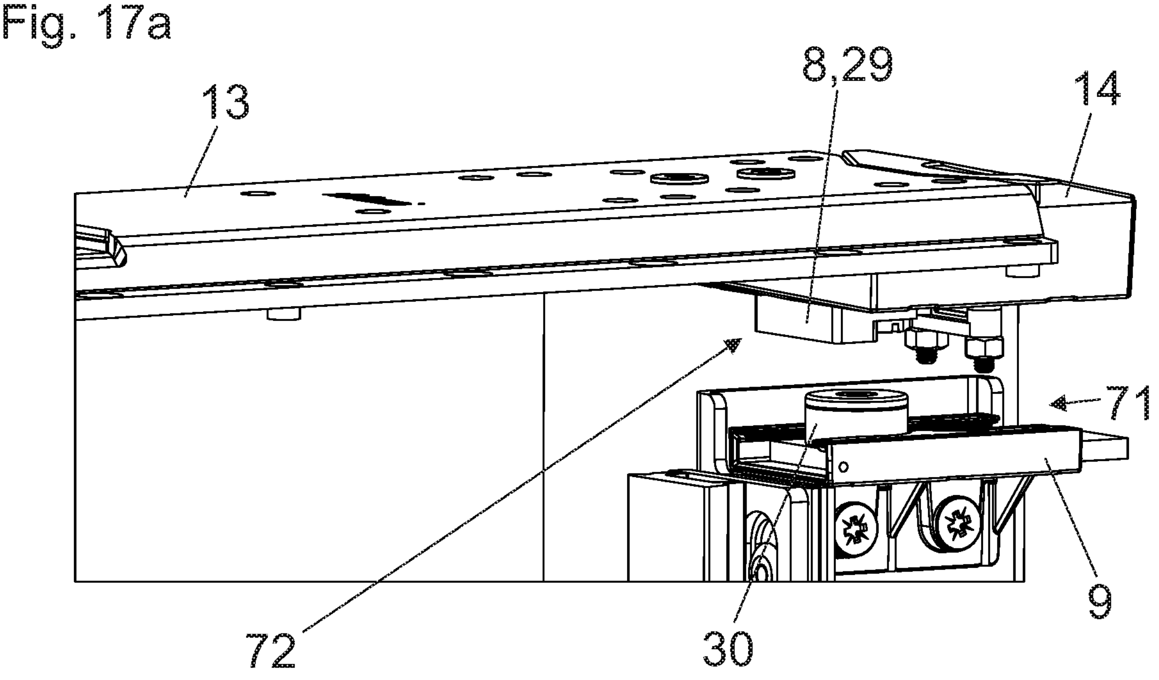
Figure 17B:
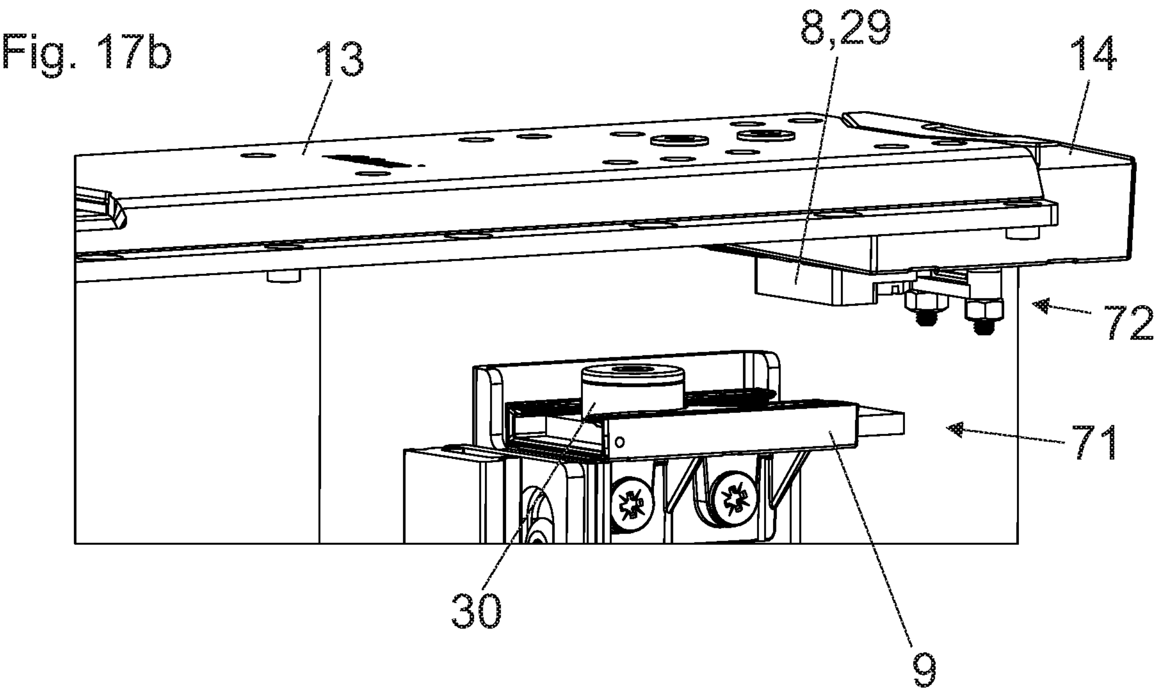

FIGS. 17*a* and 17*b* show two different positions of the support 4 with the first component 71 of the switch device 7 arranged thereon.

In FIG. 17*a* the support 4 is in a predetermined position in which the switch device 7 is triggered. For this purpose, the magnet 30 must be arranged in the proximity of the sensor 8 of the reed switch 29. The predetermined position preferably corresponds to an end position of the support 4 relative to the support-guiding rail 5. In such a position, the door leaf 2 can be pushed completely into the cavity 40. Furthermore, it is provided that in this predetermined position of the support 4, thus when the contact of the reed switch 29 is closed, the power supply for electrical appliances 11 is enabled.

In FIG. 17*b* the support 4 is in another position. In this position, the magnet 30 is not arranged in the proximity of the sensor 8 of the reed switch 29. The electrical contact in the reed switch 29 is accordingly not closed here. The power supply for electrical appliances 11 is switched off.

Figure 18:
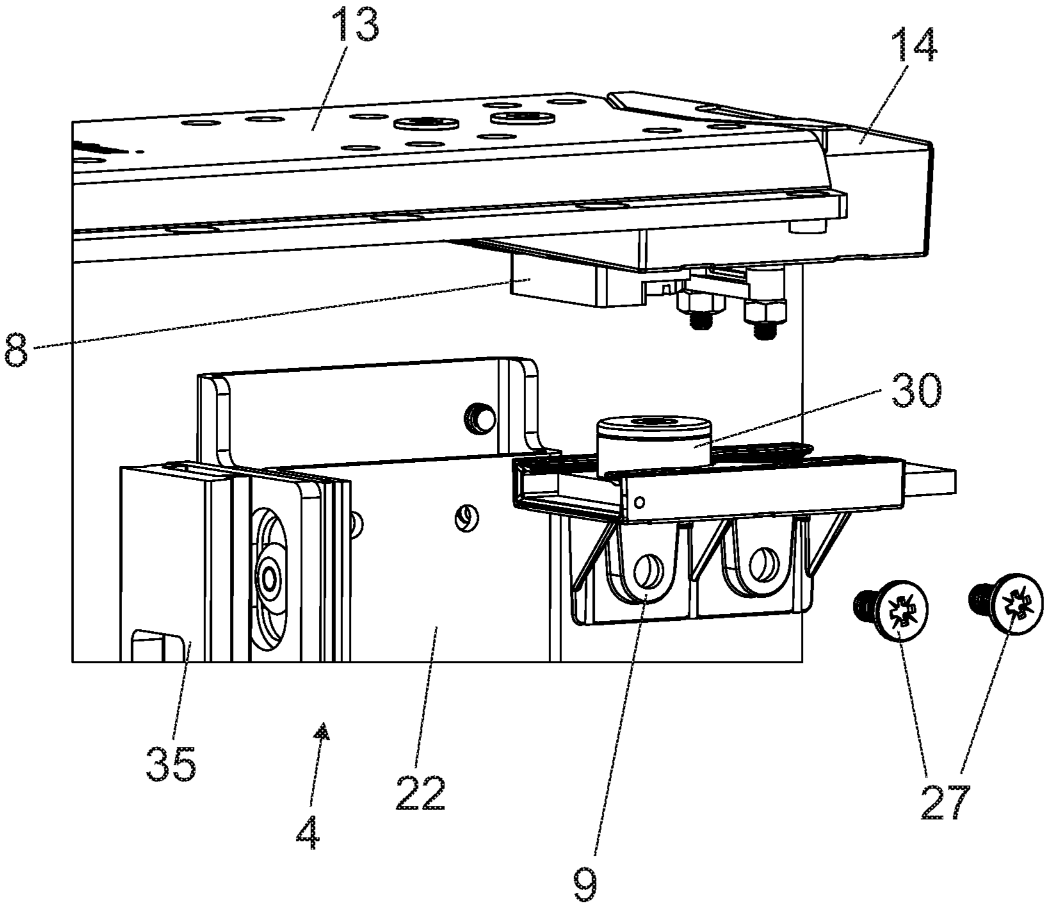
FIG. 18 shows a switch device with detached fastening means, FIGS. 19*a,b* show a first component of the switch device with a magnet a. latched and b. not latched in the interface, FIGS. 20*a,b* show a second embodiment of a piece of furniture with a two-leaf door in a. an overall representation and b. a detailed view of the switch device.

FIG. 18 shows the switch device 7 with detached fasteners 27 of the interface 9.

Figure 19A:
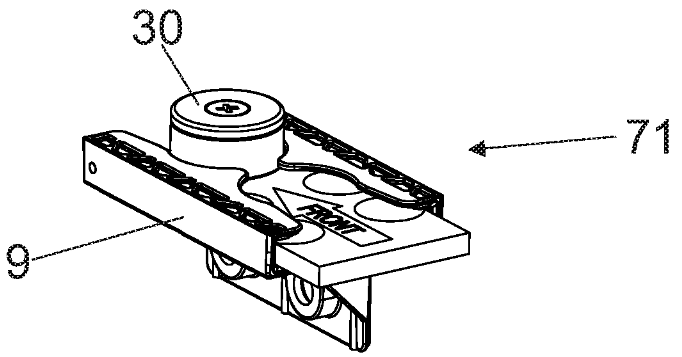
Figure 19B:
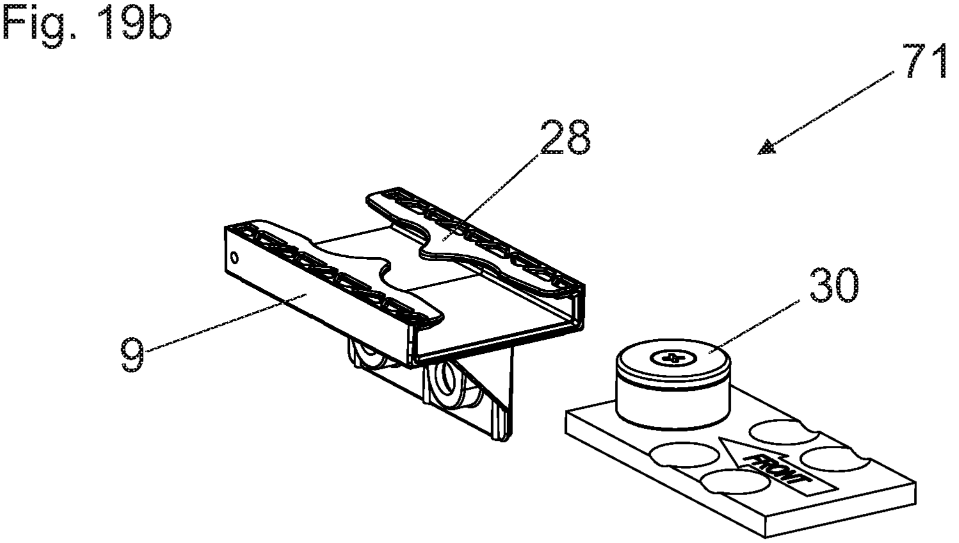

FIGS. 19*a* and 19*b* show the first component 71 of the switch device 7 with the magnet 30 latched in the catch 28 of the interface 9 and with it not latched in. In contrast to FIGS. 16*a* and 16*b*, here the first component 71 of the switch device 7 is shown in isolation.

The embodiments of the following FIGS. 20*a* to 23*b* relate preferably to a guiding system 1 for double-leaf doors with two door leaves 2, 36.

Figure 20A:
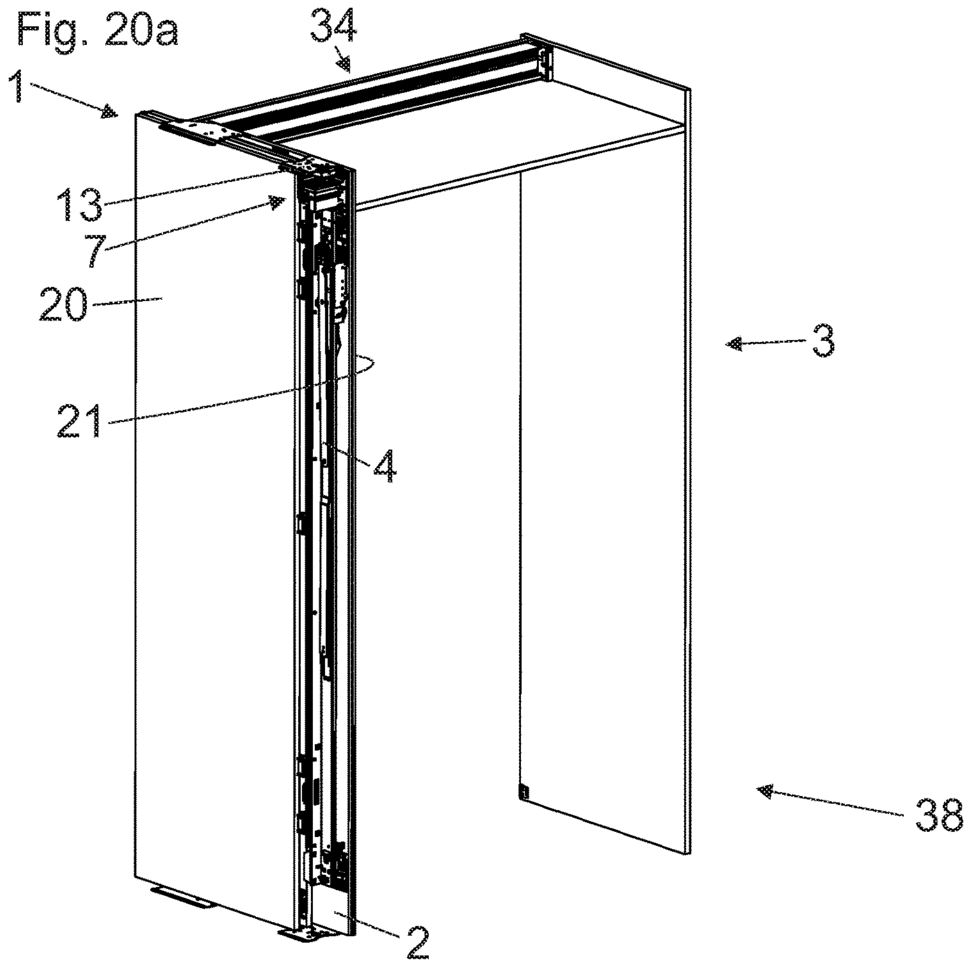

FIG. 20*a* shows a further embodiment of a piece of furniture 38 with a double-leaf door, consisting of two door leaves 2, 36. Here the door leaves 2, 36 are arranged in the cavity 40 between two side walls 20, 21. The support 4, which is arranged on the door leaf 2, can also be seen.

The at least one support 4 has a support head 22 arranged in an end region in the longitudinal direction of the support 4, wherein the at least one switch device 7 and/or the at least one sensor 8 or at least one component 71, 72 of the at least one switch device 7 and/or of the at least one sensor 8 is or can be arranged on the support head 22.

Figure 20B:
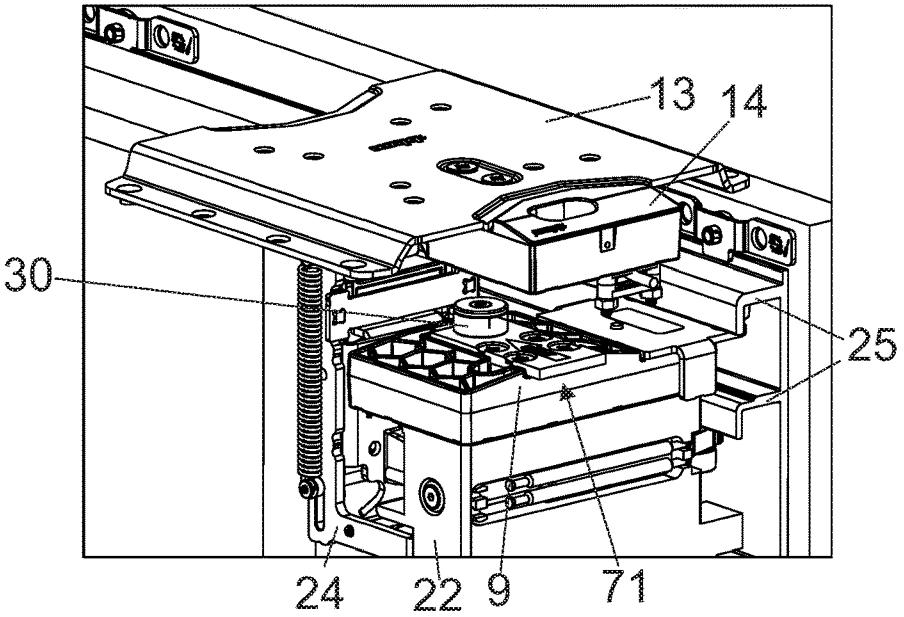

FIG. 20*b* shows a detailed view of the switch device 7. The interface 9 for the magnet 30 has a honeycombed structure here. The magnet 30 is screwed on the interface 9, via its fastening plate.

The support head 22 is or can be mounted displaceably on at least one head-guiding rail 25, wherein the at least one head-guiding rail 25 is or can be arranged parallel to the at least one support-guiding rail 5.

Figure 21:
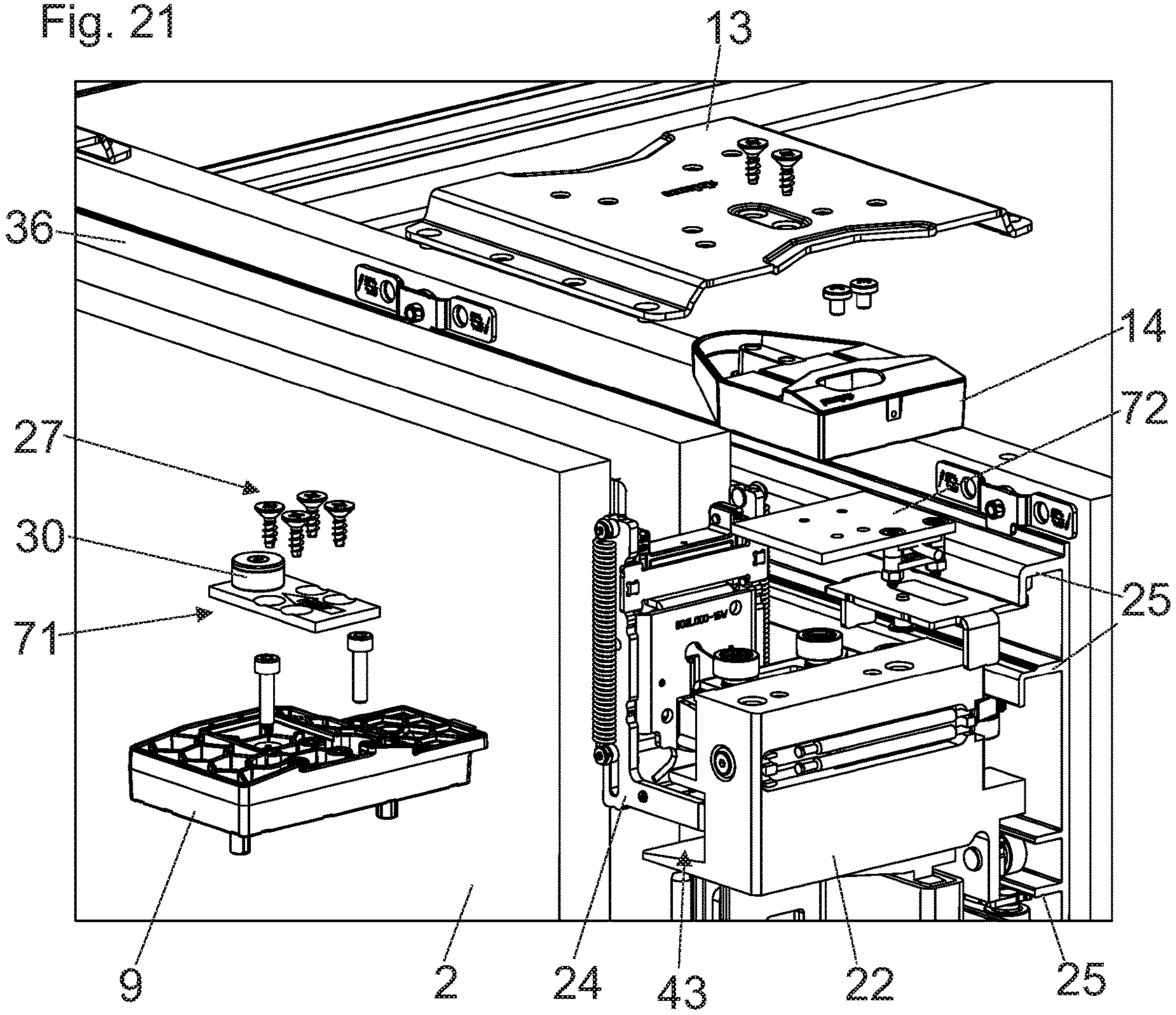
FIG. 21 shows a switch device, installation device and adapter in a. an exploded view and b. an installed state, FIGS. 22*a,b* shows a switch device, installation device and adapter in two different views, FIGS. 23*a,b* show a support with a switch device on the support head a. with and b. without installation device and adapter.

FIG. 21 shows a switch device 7, an installation device 13 and an adapter 14 in an exploded representation.

The support head 22 has at least one parking position 43 for at least one carriage 24, which can be connected to at least one door leaf 36. Following sliding of the carriage 24 (and the door leaf 36) out of the cavity 40, the carriage 24 can enter a further guiding rail 34, which runs transverse to the support-guiding rail 5. The double-leaf door can thus be folded in a controlled manner.

Figure 22A:
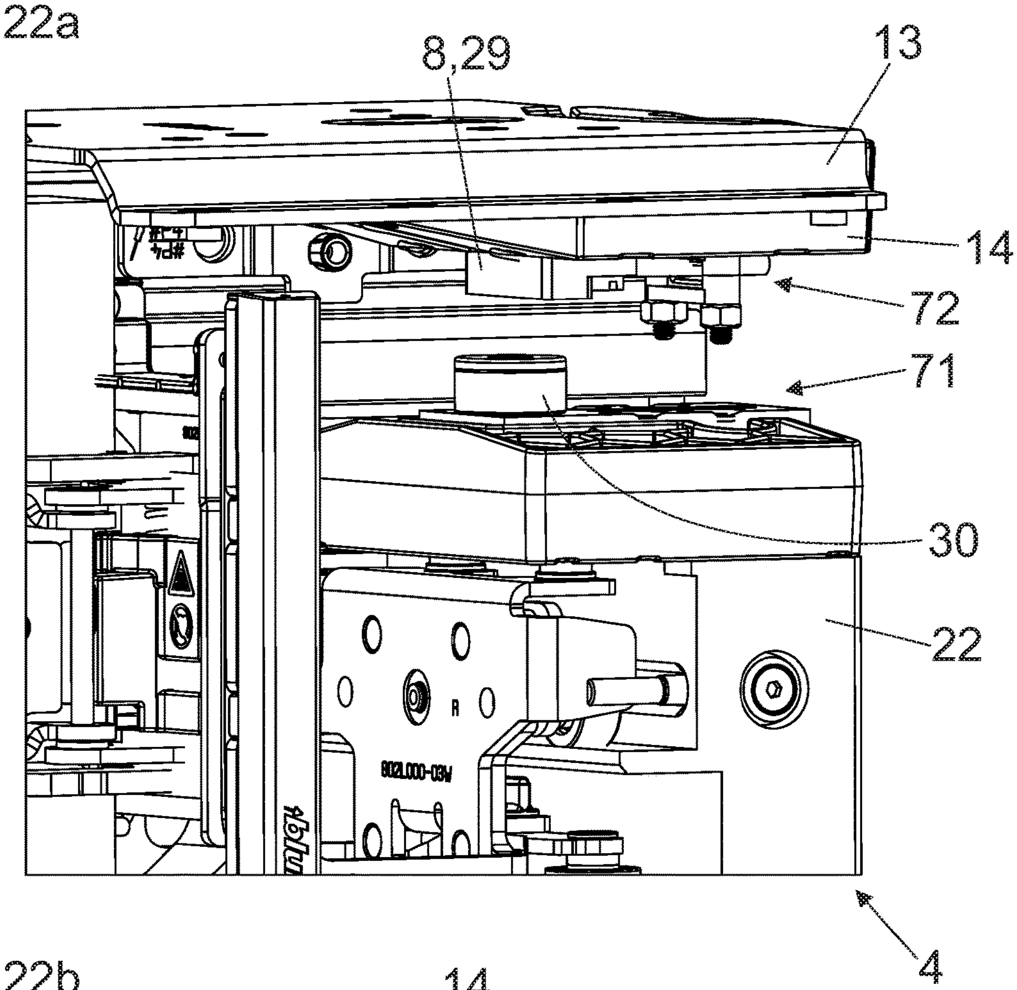
Figure 22B:
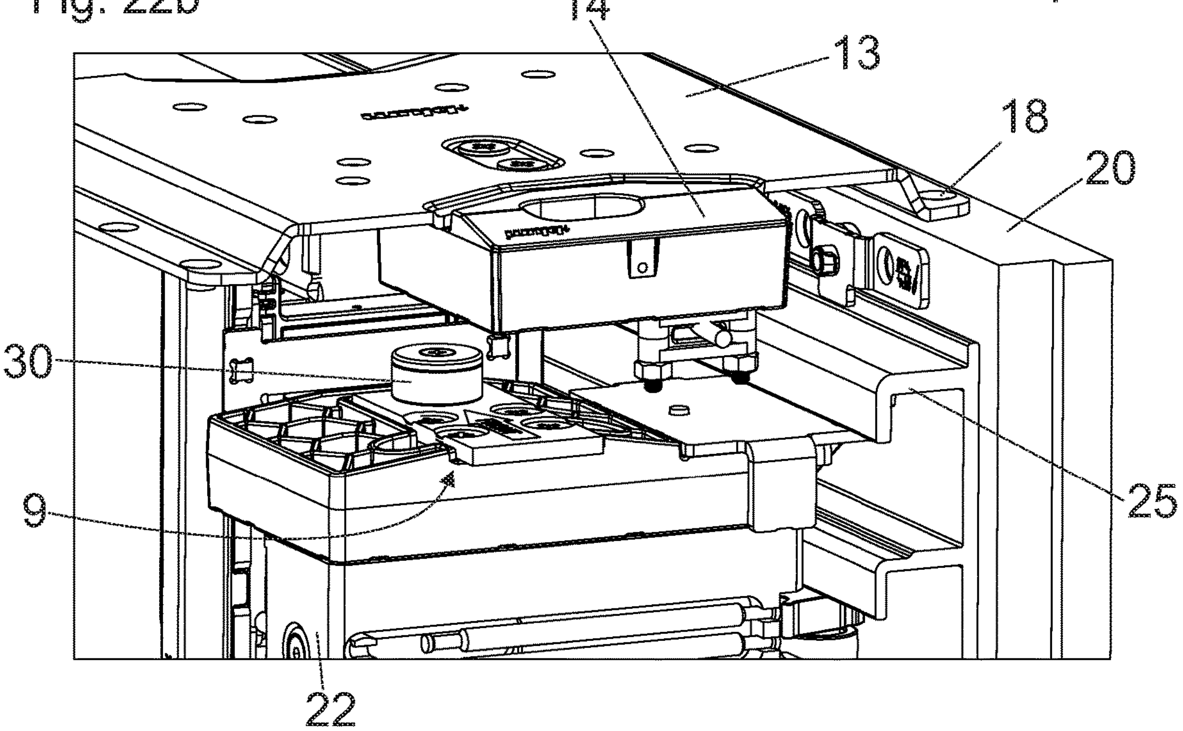

FIGS. 22*a* and 22*b* show the switch device 7, the installation device 13 and the adapter 14 in two different views.

Figure 23A:
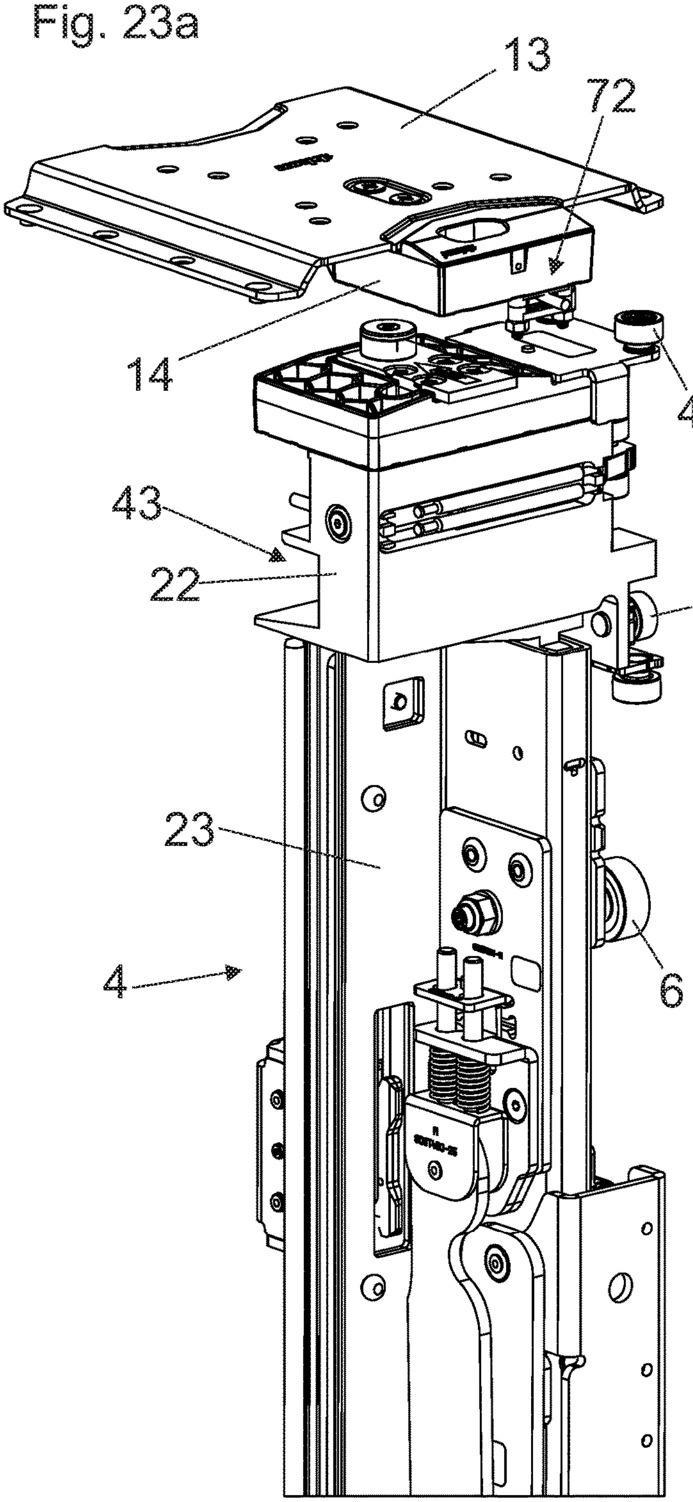
Figure 23B:
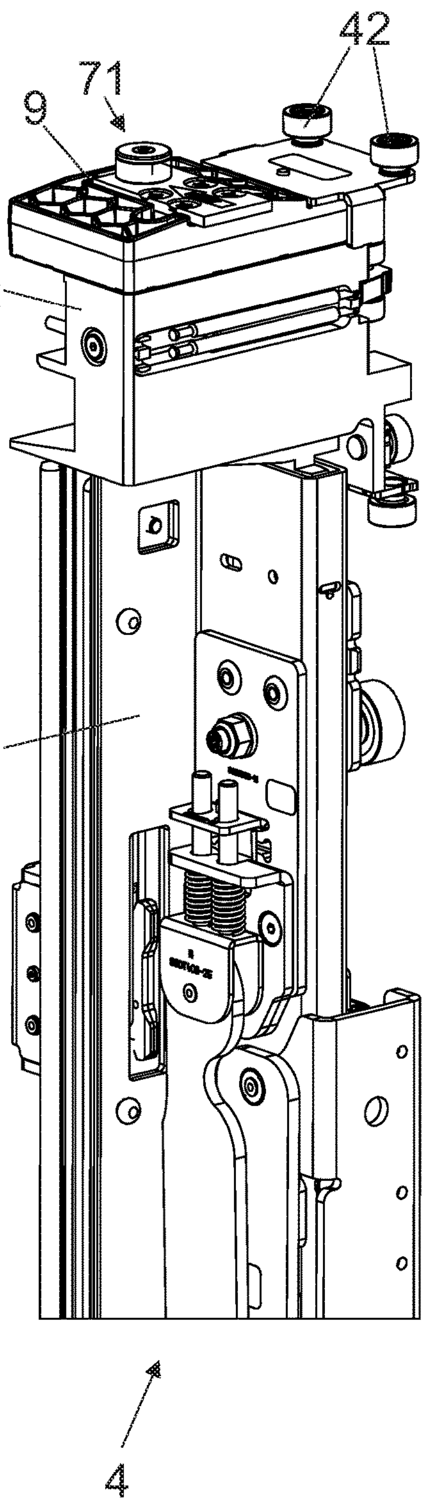

FIG. 23*a* and FIG. 23*b* show a support 4 with switch device 7 on the support head 22. In FIG. 23*a* the installation device 13 is represented with the second component 72 of the switch device 7, while it is not represented in FIG. 23*b*.

The support head 22 is mounted displaceably, preferably to a limited extent, at least in the longitudinal direction of the at least one support 4 relative to a main body 23 of the at least one support 4.

The support 4 can be mounted displaceably with at least one guiding device 6 in the support-guiding rails 5 and with at least one head-guiding device 42 in the head-guiding rails 25.

Figure 24:
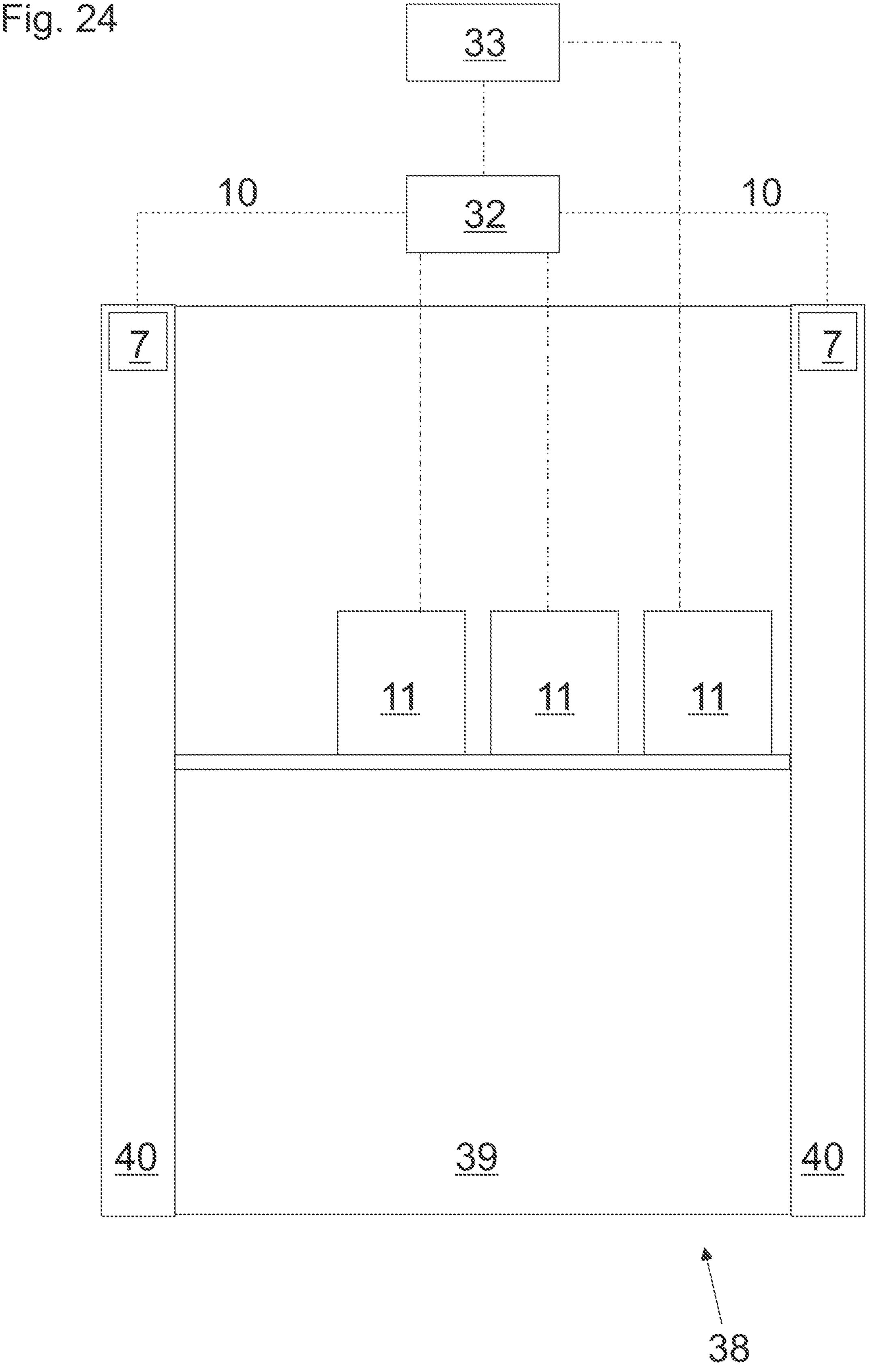
FIG. 24 is diagram of a piece of furniture with a control device, power source and switch device

FIG. 24 shows a diagram of a piece of furniture 38 with control device 32, power source 33 and two switch devices 7.

The control device 32 can be connected to the at least one switch device 7 and/or the at least one sensor 8, the at least one electrical appliance 11 and at least one power source 33.

The signals 10 generated by the switch devices 7 are forwarded to the control device 32. The control device 32 decides on the basis of the signals 10 whether the power source 33 is to supply power to the electrical appliances 11.

In the present embodiment, two guiding systems 1 are provided with at least one common control device 32. Preferably, the power supply to at least one electrical appliance 11 can be interrupted and/or enabled by at least one signal 10 from at least one of the two guiding systems 1 (with at least one switch device 7) and/or by at least one signal 10 each from the at least two guiding systems 1 (with their at least two switch devices 7).

One of the electrical appliances 11 in FIG. 24 is activated directly by the power source 33 and accordingly not controlled by the control device 32 and/or not switched by the switch devices 7. Refrigerators should not be switched off by closing the doors, for example.

LIST OF REFERENCE NUMBERS

1 guiding system
2 door leaf
3 furniture carcass
4 support
5 support-guiding rail
6 guiding device
7 switch device
  71 first component of the switch device
  72 second component of the switch device
8 sensor
9 interface
10 signal
11 electrical appliance
12 kitchen appliance
13 installation device
14 adapter
15 first fastening interface
16 second fastening interface
17 adjustment device
18 first installation interface
19 second installation interface
20 first side wall
21 second side wall
22 support head
23 main body
24 carriage
25 head-guiding rail
26 fastening means
27 screw
28 catch
29 reed switch
30 magnet
32 control device
33 power source
34 further guiding rail
35 hinge strip
36 further door leaf
37 guiding arrangement
38 piece of furniture
39 interior of the piece of furniture
40 cavity
41 cable
42 head-guiding device
43 parking position
44 bridge part
45 fastening plate
46 cable holder

The invention claimed is:

1. A guiding system for guiding a door leaf relative to a furniture carcass, comprising:

a support on which the door leaf is to be mounted;

a support-guiding rail; and a guiding device configured to displaceably mount the support on the support-guiding rail, wherein the guiding system comprises a switch device and/or a sensor or an interface for fastening the switch device and/or the sensor, wherein the switch device and/or the sensor are/is configured to generate a signal to enable and/or interrupt the power supply to an electrical appliance, wherein the switch device and/or the sensor or the interface is/are positioned relative to the support-guiding rail such that the switch device and/or the sensor is switchable and/or triggered in at least one predetermined position of the support and thus of the door leaf relative to the support-guiding rail, and wherein the guiding system further comprises:

an installation device on which the switch device and/or the sensor or a component of the switch device and/or of the sensor is fixed relative to the support-guiding rail, and an adapter configured to allow the switch device and/or the sensor or the component of the switch device to be installed with at least two different spacings relative to the installation device.

2. The guiding system according to claim 1, wherein the adapter has a first fastening interface for fastening the adapter to the installation device, and a second fastening interface spaced apart therefrom in a height direction of the adapter for fastening the switch device and/or the sensor or the component of the switch device and/or of the sensor.

3. The guiding system according to claim 2, wherein the first fastening interface is configured to detachably fasten the adapter to the installation device, and the second fastening interface is configured to detachably fasten the switch device and/or the sensor or the component of the switch device and/or of the, and wherein the adaptor:

is one of at least two adapters, the first and second fastening interfaces of the at least two adaptors being spaced apart from one another in a height direction, and/or has an adjustment device configured to adjust a position of the two fastening interfaces relative to one another in the height direction.

4. The guiding system according to claim 1, wherein the installation device:

is formed substantially flat or substantially bridge-shaped in a cross-section, and/or has a first installation interface for fastening the installation device to a first side wall of the furniture carcass and a second installation interface for fastening the installation device to a second side wall of the furniture carcass spaced apart from the first side wall.

5. The guiding system according to claim 4, wherein the first installation interface is configured to detachably fasten the installation device to the first side wall of the furniture carcass, and the second installation interface is configured to detachably fasten the installation device to the second side wall of the furniture carcass.

6. The guiding system according to claim 1, wherein the component of the switch device is a first component, and the switch device includes a second component.

7. The guiding system according to claim 6, wherein the first component is a magnet, and the second component is a reed switch, or vice versa.

8. The guiding system according to claim 6, wherein the first component is connected in a movement-coupled manner to the support, and the second component is to be fixed relative to the support-guiding rail.

9. The guiding system according to claim 1, wherein the switch device is a light barrier.

10. The guiding system according to claim 9, wherein the sensor is a light sensor.

11. The guiding system according to claim 1, further comprising a controller connected to the switch device and/or the sensor, the electrical appliance, and a power source.

12. The guiding system according to claim 1, further comprising a second guiding rail arranged substantially transverse to the support-guiding rail, wherein the door leaf is a first door leaf to be arranged on the support, the guiding system further comprising a carriage configured to mount a second door leaf on the second guiding rail, the second door leaf to be connected in an articulated manner to the first door leaf.

13. A guiding arrangement for guiding the door leaf relative to a furniture carcass, the guiding arrangement comprising at least two guiding systems each being configured according to claim 1.

14. The guiding arrangement according to claim 13, further comprising a common controller for controlling the at least two guiding systems.

15. The guiding arrangement according to claim 14, wherein the common controller is configured to interrupt and/or enable a power supply to the electrical appliance by:

by a signal from a guiding system, and/or by a signal from each of the at least two guiding systems.

16. A piece of furniture comprising:

a furniture carcass;

a door leaf; and the guiding system according to claim 1 to guide the door leaf relative to the furniture carcass, wherein the furniture carcass has an interior to be at least partially coverable by the door leaf, the electrical appliance to be arranged within the interior.

17. The piece of furniture according to claim 16, wherein the furniture carcass has a shaft-shaped cavity in which the door leaf is to be sunk.

18. The piece of furniture according to claim 17, wherein the switch device and/or the sensor or the interface is positioned relative to the furniture carcass such that the switch device and/or the sensor switched and/or triggered in a completely sunken position of the door leaf in the cavity.

19. The guiding system according to claim 1, wherein:

the door leaf is to be mounted on the support in an articulated manner;

the support-guiding rail is one of at least two support-guiding rails spaced apart from one another in a longitudinal direction of the support;

the support is to be mounted displaceably on the support-guiding rail via the guiding device in a direction substantially transverse to a longitudinal direction of the support, wherein the guiding system comprises the interface configured to detachably fasten the switch device and/or the sensor, and wherein the predetermined position is an end position of the support relative to the support-guiding rail.

20. A guiding system for guiding a door leaf relative to a furniture carcass, comprising:

a support on which the door leaf is to be mounted;

a support-guiding rail; and a guiding device configured to displaceably mount the support on the at least one support-guiding rail, wherein the guiding system comprises a switch device and/or a sensor or an interface for fastening the switch device and/or the sensor, wherein the switch device and/or the sensor are/is configured to generate a signal to enable and/or interrupt the power supply to an electrical appliance, wherein the switch device and/or the sensor or the interface is/are positioned relative to the support-guiding rail such that the switch device and/or the sensor is switchable and/or triggered in at least one predetermined position of the support and thus of the door leaf relative to the support-guiding rail, wherein the support has a support head arranged in an end region in the longitudinal direction of the support, and the switch device and/or the sensor or a component of the switch device and/or of the sensor is/are arranged on the support head.

21. The guiding system according to claim 20, wherein the switch device and/or the sensor or the component of the switch device and/or of the sensor is/are fastened to the support head via fasteners.

22. The guiding system according to claim 21, wherein the switch device and/or the sensor or the component of the switch device and/or of the sensor is detachably fastened to the support head via the fasteners, and wherein the fasteners:

are screws and/or comprise a catch, and/or are configured such that the switch device and/or the sensor or the component of the switch device and/or of the sensor is fastened to the support head by an installation movement substantially transverse to the longitudinal direction of the support.

23. The guiding system according to claim 20, wherein the support head:

is mounted displaceably at least in the longitudinal direction of the support relative to a main body of the support, and/or has a parking position for a carriage to be connected to the door leaf, and/or is configured to be mounted displaceably on a head-guiding rail parallel to the support-guiding rail.

* * * * *